(12) United States Patent
Rikiso et al.

(10) Patent No.: US 12,691,772 B2
(45) Date of Patent: Jul. 28, 2026

(54) ELECTRIC POWER CONVERTER, CONTROL METHOD FOR ELECTRIC POWER CONVERTER, ELECTRIC POWER SYSTEM, CONTROL METHOD FOR ELECTRIC POWER SYSTEM, AND COMPUTER READABLE RECORDING MEDIUM

(71) Applicant: FURUKAWA ELECTRIC CO., LTD., Tokyo (JP)

(72) Inventors: Masahiro Rikiso, Tokyo (JP); Asuka Abe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 749 days.

(21) Appl. No.: 18/065,009

(22) Filed: Dec. 13, 2022

(65) Prior Publication Data

US 2023/0114812 A1 Apr. 13, 2023

Related U.S. Application Data

(63) Continuation of application No. PCT/JP2021/024228, filed on Jun. 25, 2021.

(30) Foreign Application Priority Data

Jun. 30, 2020 (JP) ................................ 2020-112456
Oct. 30, 2020 (JP) ................................ 2020-182843

(51) Int. Cl.
B60L 53/22 (2019.01)
B60L 53/62 (2019.01)
B60L 53/63 (2019.01)
(52) U.S. Cl.
CPC .............. B60L 53/22 (2019.02); B60L 53/62 (2019.02); B60L 53/63 (2019.02)

(58) Field of Classification Search
CPC .......... B60L 53/22; B60L 53/62; B60L 53/63; B60L 53/51; B60L 53/53; H02J 1/102;
(Continued)

(56) References Cited

U.S. PATENT DOCUMENTS 5,109,326 A 4/1992 Martin, Jr.
2017/0077819 A1 3/2017 Andres
(Continued)

FOREIGN PATENT DOCUMENTS

CN 107093893 A 8/2017
CN 110 994 681 A 4/2020
(Continued)

OTHER PUBLICATIONS

J. M. Guerrero, J. C. Vásquez and R. Teodorescu, "Hierarchical control of droop-controlled DC and AC microgrids—a general approach towards standardization," 2009 35th Annual Conference of IEEE Industrial Electronics, Porto, Portugal, 2009, pp. 4305-4310, doi: 10.1109/IECON.2009.5414926. (Year: 2009).*
(Continued)

*Primary Examiner* — David V Henze
(74) *Attorney, Agent, or Firm* — Oblon, McClelland, Maier & Neustadt, L.L.P.

(57) ABSTRACT

An electric power converter for being electrically connected to a commercial power system of alternating current type and electrically connected to a device configured to input and/or output electric power. The converter includes a control unit configured to perform primary control of the device based on a reference function which has drooping characteristic for generating target value when local-control of the device is implemented according to voltage measured by the electric power converter. The electric power converter is further controlled according to secondary control in which the reference function having the drooping characteristic is
(Continued)

updated according to electric power status of an electric power system in which the electric power converter is installed, and control cycle of the primary control is different from control cycle of the secondary control.

19 Claims, 14 Drawing Sheets

(58) Field of Classification Search
CPC ...... H02J 1/14; H02J 3/32; H02J 3/322; H02J 3/381
See application file for complete search history.

(56) References Cited

U.S. PATENT DOCUMENTS

| | | | |
|---|---|---|---|
| 2018/0198276 A1* | 7/2018 | Zubieta | ..................... H02J 1/14 |
| 2020/0280183 A1 | 9/2020 | Yamashita et al. | |
| 2020/0403413 A1 | 12/2020 | Premm et al. | |
| 2021/0118067 A1* | 4/2021 | Muenz | ................... G05B 15/02 |
| 2022/0077688 A1* | 3/2022 | Patarroyo | ................ H02J 3/46 |
| 2022/0140612 A1 | 5/2022 | Premm et al. | |

FOREIGN PATENT DOCUMENTS

| | | | |
|---|---|---|---|
| JP | 2017-158264 | A | 9/2017 |
| JP | 6371603 | B2 | 8/2018 |
| JP | 2020-68650 | A | 4/2020 |
| WO | WO 2019/103059 | A1 | 5/2019 |
| WO | WO 2019/166293 | A1 | 9/2019 |

OTHER PUBLICATIONS

Indian Office Action issued on Feb. 16, 2023 in Indian Patent Application No. 202247071629, 6 pages.

International Search Report issued Sep. 14, 2021 in PCT/JP2021/024228 issued Jun. 25, 2021, 2 pages.

Extended European Search Report issued Oct. 7, 2024 in European Patent Application No. 21833411.8, 9 pgs).

Combined Chinese Office Action and Search Report issued Jan. 15, 2026 in Chinese Patent Application No. 202180044100.2 with English Machine translation, 21 pgs.

* cited by examiner

ELECTRIC POWER CONVERTER, CONTROL METHOD FOR ELECTRIC POWER CONVERTER, ELECTRIC POWER SYSTEM, CONTROL METHOD FOR ELECTRIC POWER SYSTEM, AND COMPUTER READABLE RECORDING MEDIUM

This application is a continuation of International Application No. PCT/JP2021/024228, filed on Jun. 25, 2021 which claims the benefit of priority of the prior Japanese Patent Applications No. 2020-112456, filed on Jun. 30, 2020, and No. 2020-182843, filed on Oct. 30, 2020, the entire contents of which are incorporated herein by reference.

BACKGROUND

The present disclosure relates to an electric power converter, a control method for electric power converter, an electric power system, control method for electric power system, and a computer readable recording medium.

In recent years, as a substitute for a large-scale electric power network that is dependent on fossil energy or nuclear energy, attention is currently focused on an electric power network in which the locally produced electric power is locally consumed. An electric power network in which the locally produced electric power is locally consumed has a wide variety of devices connected thereto, such as: power generation devices such as photovoltaic (PV) devices for generating electricity using reproducible energy; stationary-type electric storage devices; and electric-powered vehicles (EV). Since each such device is a direct-current power source, a study is being conducted about building an electric power network using the direct current (DC) (i.e., building a DC grid).

Typically, as a control method for controlling a DC grid, an electric power converter that is connected to each of the abovementioned devices performs constant-current control or constant-voltage control of each device based on an instruction from a central control unit, and thus performs centralized control of the electrical energy of the DC bus of the DC grid. Although such a centralized control method enables easy control of the entire DC grid, it is difficult to smoothly deal with a sudden fluctuation in the demand for electric power. Moreover, in the centralized control method, particularly, when constant-voltage control is performed at a plurality of locations over a wide range, there is a possibility that the voltage control becomes unstable and the voltage of the DC bus undergoes fluctuation. Moreover, in the constant-voltage control performed at a plurality of locations, it is not possible to share the load of electric power interchange of the devices. That is, the devices are not able to supply, in a coordinated manner, the electric power to the DC bus at a constant voltage in accordance with their power supply capability.

In that regard, the following operations are also performed to control the DC grid: a reference function is assigned to each device on the basis of the electric power (P) and the voltage (V) of that device; and, during the drooping control in which the reference function has a drooping characteristic for applying the drooping characteristic to the target voltage value of each device according to the electric energy required by the DC bus, each device is controlled in an autonomous decentralized manner (refer to Japanese Patent No. 6371603 and International Laid-open Pamphlet No. 2019/103059). When each device is controlled in an autonomous decentralized manner during the drooping control, the voltage of the DC bus may be stabilized while enabling sharing of the load of electric power interchange of the devices according to the electric energy required in the DC bus.

SUMMARY

In the known drooping control as disclosed in Japanese Patent No. 6371603 and International Laid-open Pamphlet No. 2019/103059, the reference function having the drooping characteristic is updated in an autonomous decentralized manner based on the individual device information of each device. Thus, in the known drooping control, the autonomous decentralized control of each device and the updating of the reference function is not performed in a hierarchical manner. Hence, there is a need for improvement from the perspective of efficiently supplying the required electric power to the entire DC grid.

There is a need for an electric power converter, a control method for the electric power converter, an electric power system, a control method for the electric power system, and a computer readable recording medium that enable achieving improvement in the control of an entire electric power network by accurately reflecting the time-varying required electric power of the entire electric power network in the control of each device, and that enable supplying the required electric power to the entire electric power network in an efficient manner.

According to one aspect of the present disclosure, there is provided an electric power converter for being electrically connected to a commercial power system of alternating current type and electrically connected to a device configured to input and/or output electric power, the electric power converter including: a control unit configured to perform primary control of the device based on a reference function which has drooping characteristic for generating target value when local-control of the device is implemented according to voltage measured by the electric power converter, wherein the electric power converter is further controlled according to secondary control in which the reference function having the drooping characteristic is updated according to electric power status of an electric power system in which the electric power converter is installed, and control cycle of the primary control is different from control cycle of the secondary control.

DETAILED DESCRIPTION

Figure 1:
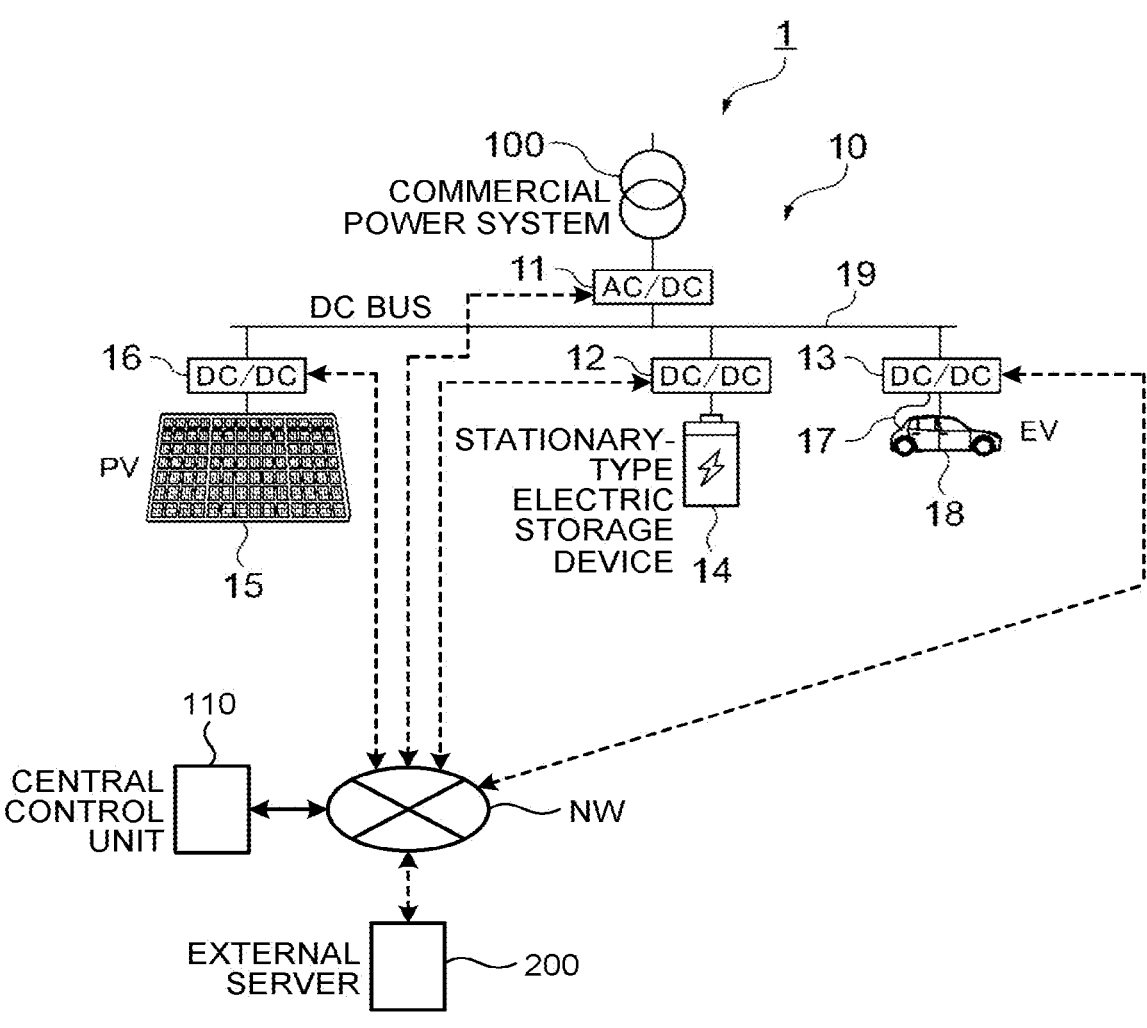
FIG. 1 is an explanatory diagram illustrating the overview of an entire electric power network that constitutes an electric power system according to a first embodiment of the present disclosure.
Figure 2:
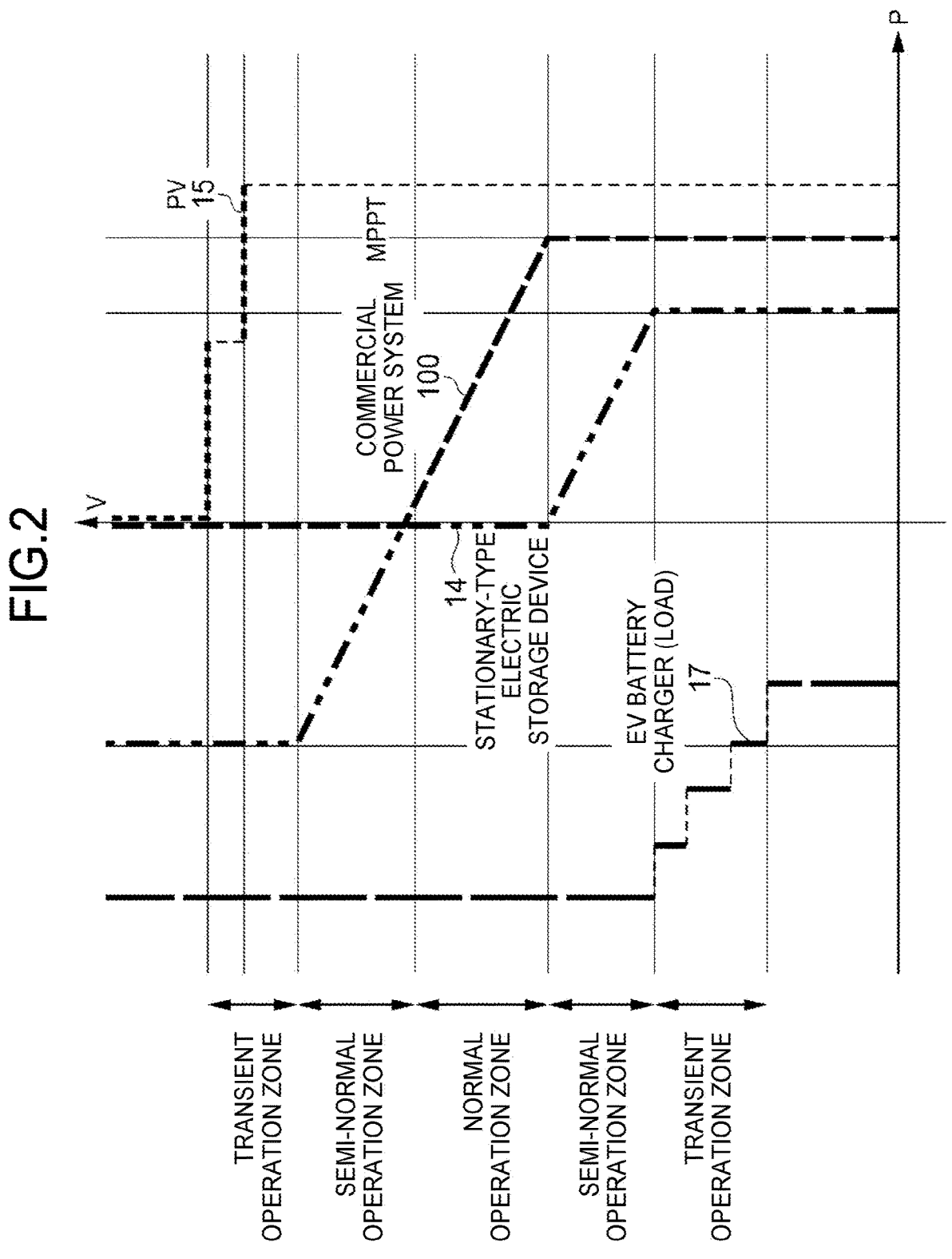
FIG. 2 is an explanatory diagram for explaining the drooping characteristic applied to the devices used in the electric power network that constitutes the electric power system according to the first embodiment of the present disclosure.
Figure 3:
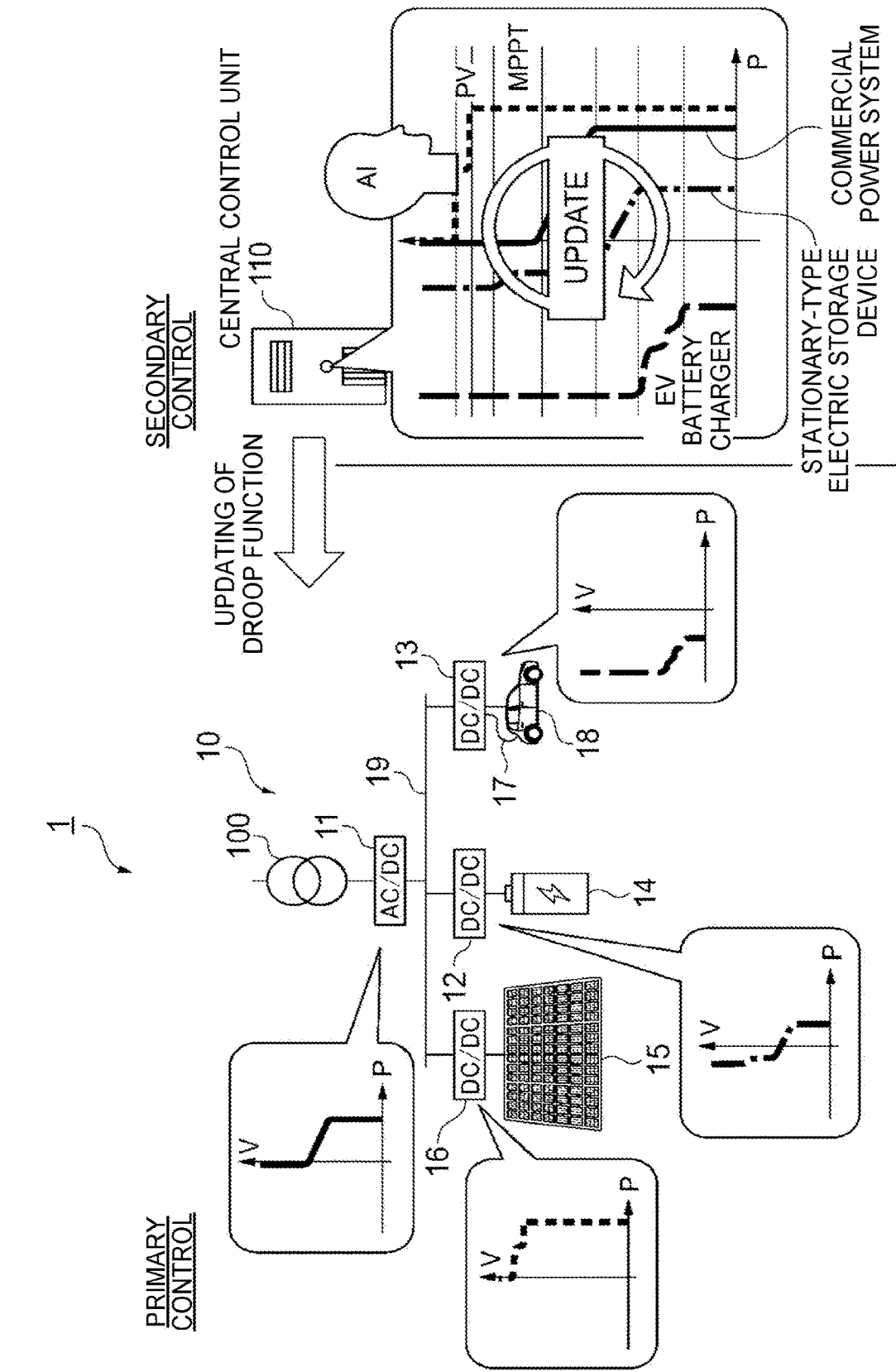
FIG. 3 is an explanatory diagram for explaining the updating of the drooping characteristic applied to the devices used in the electric power network that constitutes the electric power system according to the first embodiment of the present disclosure.
Figure 4:
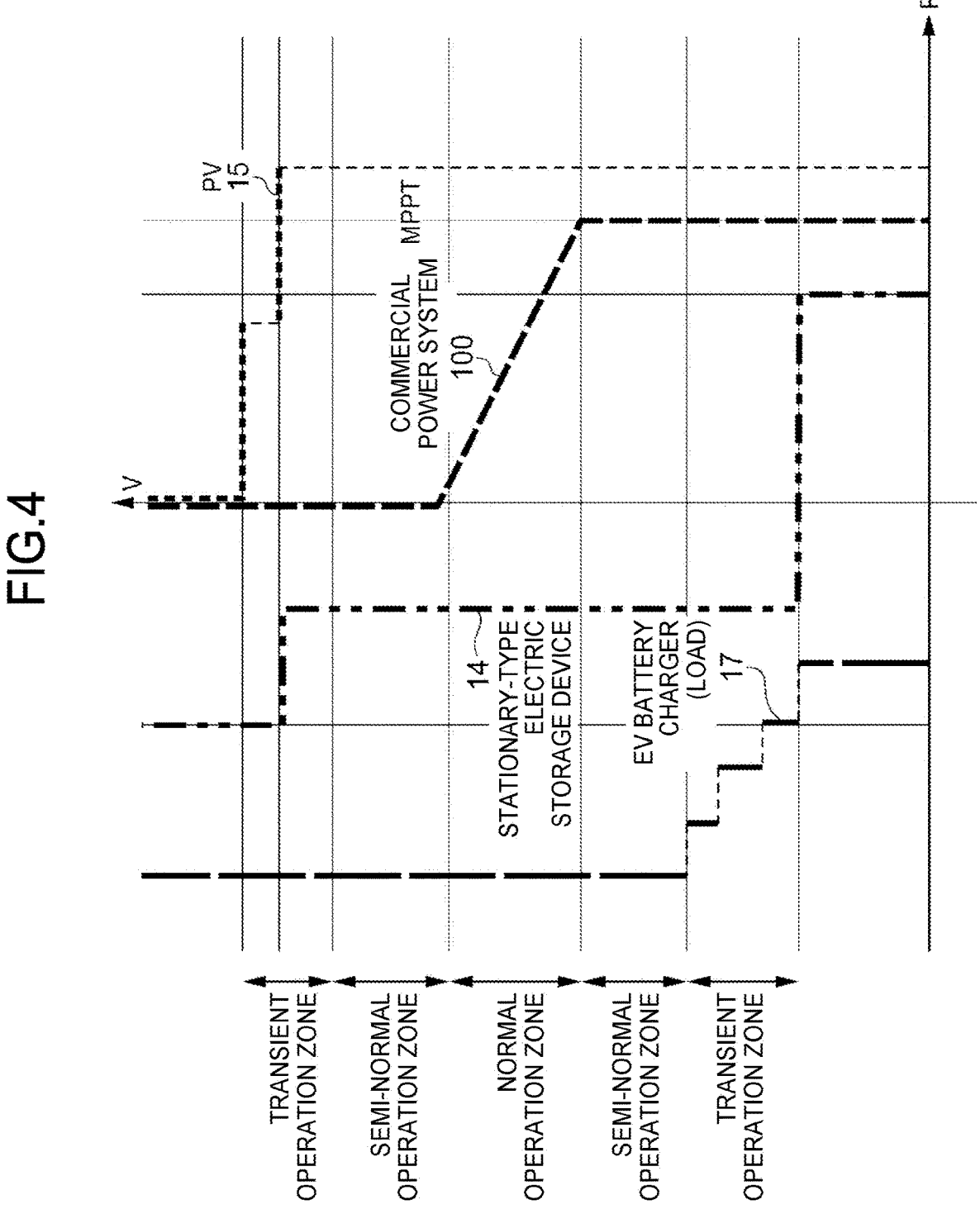
FIG. 4 is an explanatory diagram illustrating an example of updating the drooping characteristic of a stationary-type electric storage device used in the electric power system according to the first embodiment of the present disclosure.

As an exemplary embodiment of an electric power system according to the present disclosure, given below is the description of an electric power system according to a first embodiment. FIG. 1 is an explanatory diagram illustrating the overview of an entire electric power network that constitutes the electric power system according to the first embodiment of the present disclosure. FIG. 2 is an explanatory diagram for explaining the drooping characteristic applied to the devices used in the electric power network that constitutes the electric power system according to the first embodiment of the present disclosure. FIG. 3 is an explanatory diagram for explaining the updating of the drooping characteristic applied to the devices used in the electric power network that constitutes the electric power system according to the first embodiment of the present disclosure. FIG. 4 is an explanatory diagram illustrating an example of updating the drooping characteristic of a stationary-type electric storage device used in the electric power system according to the first embodiment of the present disclosure.

As illustrated in FIG. 1, in an electric power network 10 that constitutes an electric power system 1 according to the first embodiment, a plurality of electric power elements is installed, including: electric power converters that are electrically connected to a commercial power system 100 of the alternating current type, and devices that are electrically connected to the electric power converters. More particularly, the electric power elements include: an AC/DC converter 11 that is connectible to the commercial power system 100 of the alternating current type, that converts the alternating-current power input from the commercial power system 100 of the alternating current type into the direct-current power, and that outputs the direct-current power; a DC bus 19 that is connected to the output of the AC/DC converter 11; a first DC/DC converter 13 that is connected to the DC bus 19, that converts the direct-current power input from the DC bus 19 into the charging voltage meant for a storage battery to be charged, and that outputs the charging voltage; a battery charger (in the electric power network 10, an EV battery charger 17) that is connected to the first DC/DC converter 13 and that is connectible to a storage battery to be charged; a bidirectional DC/DC converter 12 that is connected to the DC bus 19, that converts the direct-current power input from the DC bus 19 into the charging voltage meant for a stationary-type electric storage device 14, and that outputs the charging voltage; and a photovoltaic device (PV) 15 that is connected to the DC bus 19 via a second DC/DC converter 16 and that is a power generation device for generating electricity using reproducible energy. Thus, according to the explanation given above, the electric power network 10 represents a DC grid. In the electric power network 10, a storage battery implies, for example, an in-vehicle storage battery installed in an electric-powered vehicle (EV) 18. The output of the DC bus 19 is connected to the EV battery charger 17, and the in-vehicle storage battery of the electric-powered vehicle 18 is connected to the EV battery charger 17 for the charging purpose. The stationary-type electric storage device 14 represents the in-facility electric storage device of the electric power network 10. In this way, the devices are electrically connected to the electric power converters and are capable of receiving input of the electric power and/or capable of outputting the electric power.

As an example, each electric power converter includes an electric power converting unit, a sensor, a control unit, and a communication unit.

The electric power converting unit is equipped with an electric power conversion function for performing AC/DC conversion or DC/DC conversion in the corresponding electric power converter; and is configured using, for example, an electric circuit that includes a coil, a capacitor, a diode, and a switching element. The switching element is, for example, a field-effect capacitor or an insulated gate bipolar transistor. The electric power conversion characteristic of the electric power converting unit may be controlled according to, for example, PWM (Pulse Width Modulation) control.

The sensor is used to measure the electrical characteristic values of the corresponding electric power converter, such as the current value, the voltage value, and the power value. Then, the sensor outputs the measured values to the control unit.

In the electric power system 1 including the electric power network 10, the amount of electric power received from the commercial power system 100 is controlled by the control units. Moreover, the control units also control the charging and discharging of the stationary-type electric storage device 14, the discharging of the photovoltaic device 15, and the charging of the in-vehicle storage battery of the electric-powered vehicle 18 that is connected to the EV battery charger 17.

Each control unit is configured using a processor, which enables a variety of arithmetic processing for controlling the electric power conversion function, and a memory unit. Examples of the processor include a CPU (Central Processing Unit), an ASIC (Application Specific Integrated Circuit), an FPGA (Field-Programmable Gate Array), a DSP (Digital Signal Processor), and a GPU (Graphics Processing Unit). The memory unit includes, for example, a ROM (Read Only Memory) that is used to store various programs and data to be used by the processor to perform arithmetic processing. Moreover, the memory unit includes, for example, a RAM (Random Access Memory) that is used as the work space by the processor at the time of performing arithmetic processing and that is used to store the result of the arithmetic processing performed by the processor. The memory unit may also include an auxiliary memory device such as an HDD (Hard Disk Drive) or an SSD (Solid State Drive). When the processor reads various programs from the memory unit and executes them, the functions of the control unit are implemented as function units. For example, the control unit outputs, to the electric power converting unit, a PWM signal including the information about the operation amount (for example, the duty ratio) required for PWM (Pulse Width Modulation); and performs PWM control of the corresponding electric power converter. Meanwhile, the control unit may output the operation amount either directly to the electric power converting unit or via another function unit (for example, a loop control unit) (not illustrated).

The communication unit is configured using a communication module that communicates information in a wired manner or a wireless manner, and using a communication control unit that controls the operations of the communication module. The communication unit communicates information with a central control unit 110 (explained later) via a network NW configured using an Internet connection or a cellular phone line. For example, the communication unit receives a command from the central control unit 110 and outputs it to the control unit. Moreover, for example, the communication unit sends, to the central control unit 110, information related to the electric power status as input from the control unit. When the information related to the electric power status is in the form of the measurement values obtained by the sensor, the communication unit may send, for example, the measurement values input from the sensor to the central control unit 110.

In the electric power system 1, each electric power converter has the function of performing primary control in which the control is performed to ensure that such a reference function is followed which has the drooping characteristic for generating the target value at the time of performing, what is called, local-control meant for controlling the corresponding device according to the voltage measured in the concerned electric power converter (i.e., according to the own voltage). For example, the primary control is performed by the control unit of each electric power converter. Meanwhile, the "drooping characteristic" indicates that the relationship between the voltage of the concerned converter and the input-output amount of the electric power of the concerned converter excludes the relationship in which the input-output amount of the electric power is constant over a predetermined range of voltage or excludes the relationship in which the voltage is constant over a predetermined range of the input-output amount of the electric power.

That is, in the electric power system 1, the AC/DC converter 11 that converts the alternating-current power, which is input from the commercial power system 100 of the alternating current type, into the direct-current power and that outputs the direct-current power has the function of performing the primary control in such a way that the relationship between its voltage (V) and the electric power (P) to be output to the DC bus 19 has a predetermined drooping characteristic. Thus, the AC/DC converter 11 has the function of performing control, in a predetermined control cycle, in such a way that the relationship between the voltage (V) of the AC/DC converter 11 and the electric power (P) to be output to the DC bus 19 maintains the reference function having a predetermined drooping characteristic.

More particularly, as illustrated in FIG. 2, during normal operations, the AC/DC converter 11 that is connected to the commercial power system 100 performs the primary control using such a function which has the drooping characteristic for maximizing the drooping characteristic in the normal operation zone, so as to ensure a stable supply of electric power with a focus on the power supply from the commercial power system 100. On the other hand, in the semi-normal operation zone and the transient operation zone in which the demand for the electric power is low (i.e., with reference to FIG. 2, in the semi-normal operation zone and the transient operation zone illustrated on the upper side having high values of the voltage (V)), the AC/DC converter 11 sets a dead zone (a vertical zone illustrated in FIG. 2) to ensure that the supply of the electric power from the commercial power system 100 is discontinued. Moreover, in the semi-normal operation zone and the transient operation zone in which the demand for the electric power is high (i.e., with reference to FIG. 2, in the semi-normal operation zone and the transient operation zone illustrated on the lower side having low values of the voltage (V)), the AC/DC converter 11 sets a dead zone (a vertical zone illustrated in FIG. 2) to ensure that the supply of the electric power from the commercial power system 100 does not exceed the contracted power.

The first DC/DC converter 13 that converts the direct-current power, which is input from the DC bus 19, into the charging voltage for the in-vehicle storage battery of the electric-powered vehicle 18 representing the charging target and that outputs the direct-current power has the function of performing the primary control in such a way that the relationship between its voltage (V) and the electric power (P) input from the DC bus 19 constitutes a predetermined characteristic. That is, the first DC/DC converter 13 has the function of performing control, in a predetermined control cycle, in such a way that the relationship between the voltage (V) of the first DC/DC converter 13 and the electric power (P) input from the DC bus 19 maintain the function having a predetermined characteristic.

More particularly, as illustrated in FIG. 2, the first DC/DC converter 13 that is connected to the EV battery charger 17 performs output control in the transient operation zone in which the demand for electric power is high. However, the first DC/DC converter 13 does not perform output control in the semi-normal operation zone in which the demand for electric power is high, or in the normal operation zone, or in the semi-normal operation zone and the transient operation zone in which the demand for electric power is low.

The bidirectional DC/DC converter 12 that is connected to the stationary-type electric storage device 14 has the function of performing the primary control in such a way that the relationship between the voltage (V) of the bidirectional DC/DC converter 12 and the electric power (P) input from the DC bus 19 follows the reference function having a predetermined drooping characteristic. That is, the bidirectional DC/DC converter 12 has the function of performing control, in a predetermined control cycle, in such a way that the relationship between the voltage (V) of the bidirectional DC/DC converter 12 and the electric power (P) input from the DC bus 19 maintains the reference function having a predetermined drooping characteristic.

More particularly, as illustrated in FIG. 2, the bidirectional DC/DC converter 12 that is connected to the stationary-type electric storage device 14 performs the primary control to set a dead zone in the normal operation zone for ensuring that no charging and discharging occurs and to perform discharging using the reference function having the drooping characteristic for maximizing the drooping characteristic in the semi-normal operation zone in which the demand for electric power is high. Moreover, the bidirectional DC/DC converter 12 performs the primary control to perform charging using the reference function having the drooping characteristic for maximizing the drooping characteristic in the semi-normal operation zone in which the demand for electric power is low.

The second DC/DC converter 16 that is connected to the photovoltaic device (PV) 15 has the function of performing the primary control in such a way that the relationship between its voltage (V) and the electric power (P) to be output to the DC bus 19 constitutes a predetermined characteristic. That is, the second DC/DC converter 16 has the function of performing control, in a predetermined control cycle, in such a way the relationship between the voltage (V) of the second DC/DC converter 16 and the electric power (P) to be output to the DC bus 19 maintains the function having a predetermined characteristic.

More particularly, as illustrated in FIG. 2, the second DC/DC converter 16 that is connected to the photovoltaic device (PV) 15 performs output control in the transient operation zone in which the demand for electric power is low, and performs maximum power point tracking control (MPPT) in the other operation zones.

Thus, according to the explanation given above, in the electric power system 1, the reference function having a drooping characteristic is configured in such a way that the input-output amount of the electric power (P) of each device, such as the stationary-type electric storage device 14, is varied according to the variation in the voltage (V) of the entire electric power system 1. Moreover, in the electric power system 1, each electric power element (each device and the electric power converter connected to that device) performs the primary control in a dispersed manner based on the own voltage and the own electric power. That is, the primary control is performed based on the voltage of each concerned device that is connected to an electric power converter.

Moreover, in the electric power system 1, a function is also provided for performing secondary control in which the reference function having the abovementioned drooping characteristic is updated according to the electric power status of a plurality of electric power elements. The secondary control is performed based on the relationship between the amount of electric power discharge from the line (DC bus 19) to which a plurality of electric power elements is electrically connected and the amount of electric power received from the line (the DC bus 19). That is, in the secondary control, the function for the primary control as provided in a predetermined electric power converter is updated by reflecting not only the electric power status of the concerned electric power converter but also the electric power status of the other electric power converters constituting the electric power system 1.

As illustrated in FIG. 3, in the electric power system 1, during the secondary control, comprehensive evaluation is performed regarding the function for the primary control provided in each of the electric power converters including the AC/DC converter 11, the bidirectional DC/DC converter 12, the first DC/DC converter 13, and the second DC/DC converter 16; and then the function for the primary control provided in each of the electric power converters including the AC/DC converter 11, the bidirectional DC/DC converter 12, the first DC/DC converter 13, and the second DC/DC converter 16 is updated. In order to update the function for the primary control provided in each electric power converter, it is possible to use, for example, a computer equipped with AI (artificial intelligence).

Moreover, the electric power system 1 further includes the central control unit 110 that controls a plurality of electric power converters (in the electric power system 1, controls the AC/DC converter 11, the bidirectional DC/DC converter 12, the first DC/DC converter 13, and the second DC/DC converter 16); and the secondary control is performed based on a command issued by the central control unit 110. The central control unit 110 is connected to each of the electric power converters including the AC/DC converter 11, the bidirectional DC/DC converter 12, the first DC/DC converter 13, and the second DC/DC converter 16 via a communication unit. Thus, the secondary control is performed according to the centralized control method.

Given below is the explanation of an example of the central control unit 110. The central control unit 110 includes a control unit, a memory unit, and a communication unit. Herein, the configuration of the control unit, the memory unit, and the communication unit may be identical to the configuration of the control unit, the memory unit, and the communication unit of an electric power converter.

When the control unit reads various programs from the memory unit and executes them, the functions of the control unit are implemented as function units.

The communication unit communicates information with the electric power converters and an external server 200 via the network NW.

The external server 200 is a server installed on the outside of the electric power system 1. For example, the external server 200 is an information processing device configured to function as an energy management system (EMS) in some other electric power system, or is an information processing device that includes databases and that functions as a data server for the central control unit 110. The external server 200 is used to store a variety of information that is likely to affect the operation of the electric power system 1.

Thus, according to the explanation given above, in the electric power system 1, hierarchical control is performed that includes the primary control representing a decentralized control method, and includes the secondary control representing a centralized control method. The primary control is performed without involving a command from the central control unit 110 and is performed based on the voltage of each device such as the stationary-type electric storage device 14. The secondary control is performed based on, for example, the overall condition of the electric power system 1, and may be considered as the control performed at a higher level than the primary control. The central control unit 110 is an EMS. In each electric power converter or in the central control unit 110, a program causes the processor to perform the primary control and the secondary control.

More particularly, for example, during the secondary control performed in the electric power system 1, in the bidirectional DC/DC converter 12 connected to the stationary-type electric storage device 14, the reference function having a predetermined drooping characteristic is updated, in a predetermined control cycle, by reflecting the electric power status of the bidirectional DC/DC converter 12 as well as by reflecting the electric power status of the other electric power converters (the AC/DC converter 11, the first DC/DC converter 13, and the second DC/DC converter 16) according to an instruction issued by the central control unit 110. More particularly, for example, if the central control unit 110 determines that the weather forecast indicates clear skies and that the power generation amount of the photovoltaic device (PV) 15 is predicted to increase as well as determines that the function for the primary control of the photovoltaic device (PV) 15 as controlled by the second DC/DC converter 16 has leeway in regard to the supply of the electric power, then the reference function of the bidirectional DC/DC converter 12 is updated to have the drooping characteristic for charging the stationary-type electric storage device 14 even in the normal operation zone. Moreover, as explained earlier, while updating the reference function of the bidirectional DC/DC converter 12; the reference function of the AC/DC converter 11, which is connected to the commercial power system 100, is updated in such a way that the supply of the electric power from the commercial power system 100 is discontinued in the normal operation zone and that the drooping characteristic is provided in the semi-normal operation zone in which the demand for electric power is high.

Moreover, in the secondary control, the reference function having the drooping characteristics may be updated in such a way that the electric power of the concerned device representing an electric power element becomes constant.

For example, as illustrated in FIG. 4, in the case of charging the stationary-type electric storage device 14 for streamlining the charged state thereof, in order to enhance the charging rate of the stationary-type electric storage device 14, in the normal operation zone and the semi-normal operation zone, the function for the primary control of the bidirectional DC/DC converter 12 is updated in such a way that the power value of the charging current to the stationary-type electric storage device 14 becomes a constant value. At that time, if there is surplus in the power generation amount of the photovoltaic device (PV) 15, in order to streamline the charged state of the stationary-type electric storage device 14, the charging current may be supplied from the photovoltaic device (PV) 15 to the stationary-type electric storage device 14.

For example, during the secondary control, if the communication of information between the central control unit 110 and the electric power converters is performed according to the TCP/IP protocol, then function information is included in the data portion of the IP packets of the command signal for function updating. The function information is about, for example, coordinate information of the boundary of the function representing the drooping characteristic (a droop function), segment information of the droop function, information about the inclination (i.e., the drooping coefficient), and information about the shape (a straight line or a curved line). Such information is defined in, for example, the P-V coordinates. In the data portion of the IP packets, the target information for updating from among the abovementioned information is included as data columns. The function information used in the updating is stored in the memory unit of the central control unit 110, and is read and used by the control unit.

Meanwhile, as illustrated in FIG. 4, in order to maintain the operation voltage range of the electric power system, in case there is a steep voltage fluctuation, the bidirectional DC/DC converter 12 performs maximum discharge control or maximum charge control.

In the electric power system 1, the control cycle of the primary control is different than the control cycle of the secondary control. During the primary control, the control is performed in such a way that the relationship between the voltage of the concerned device and the electric power to be output to the DC bus 19 maintains the reference function having a predetermined drooping characteristic. Hence, the control cycle of the primary control is, for example, equal to or smaller than one second. On the other hand, during the secondary control, the function for the primary control provided in each electric power converter is updated based on the overall situation about the demand and the supply of the electric power the entire electric power system 1. Hence, the control cycle of the secondary control is, for example, in the range of a few tens of minutes to a few hours. Thus, the control cycle of the secondary control is longer than the control cycle of the primary control.

In the electric power system 1, the function for the primary control is provided in which, according to the voltage measured in each of the electric power converters including the AC/DC converter 11, the bidirectional DC/DC converter 12, the first DC/DC converter 13, and the second DC/DC converter 16, the control is performed to ensure that such a reference function is followed which has the drooping characteristic for generating the target value at the time of performing local-control meant for controlling the device connected to the concerned electric power converter (i.e., controlling the commercial power system 100, the stationary-type electric storage device, the EV battery charger 17, or the photovoltaic device (PV) 15). Moreover, the function for the secondary control is provided in which, according to the electric power status of the electric power element corresponding to each of the AC/DC converter 11, the bidirectional DC/DC converter 12, the first DC/DC converter 13, and the second DC/DC converter 16, the abovementioned reference function having the drooping characteristic is updated by reflecting the overall situation about the demand and the supply of the electric power in the entire electric power system 1. Furthermore, since the control cycle of the primary control and the control cycle of the secondary control implement different types of hierarchical control, the time-varying required electric power of the entire electric power network 10 is accurately reflected in the control of each device. It results in an improved control of the entire electric power network 10, and the required electric power may be efficiently supplied to the entire electric power network 10.

Moreover, in the electric power system 1, the function for the secondary control is further provided for updating the reference function, which has the drooping characteristic, according to the electric power status of the concerned electric power element as measured by the AC/DC converter 11, the bidirectional DC/DC converter 12, the first DC/DC converter 13, or the second DC/DC converter 16. As a result, according to the electric power status of the electric power elements such as the AC/DC converter 11, the bidirectional DC/DC converter 12, the first DC/DC converter 13, and the second DC/DC converter 16; the control of the entire electric power network 10 may be performed in a flexible manner, such as putting a limit on the maximum power consumption or utilizing the night-time electricity.

Furthermore, the electric power system 1 further includes the central control unit 110 that controls the electric power elements such as the AC/DC converter 11, the bidirectional DC/DC converter 12, the first DC/DC converter 13, and the second DC/DC converter 16; and the secondary control is performed based on a command issued by the central control unit 110. As a result, the time-varying required electric power of the entire electric power network 10 may be reflected with more accuracy in the control of each device, and the control of the entire electric power network 10 may be improved in a more reliable manner.

Moreover, in the electric power system 1, the secondary control is performed based on the relationship between the amount of electric power discharged from the DC bus 19 and the amount of electric power received by the DC bus 19. As a result, the time-varying required electric power of the entire electric power network 10 may be reflected with more accuracy in the control of each device, and the control of the entire electric power network 10 may be improved in a more reliable manner.

Furthermore, in the electric power system 1, the secondary control is performed in such a way that the electric power of each device representing an electric power element becomes constant. As a result, when the electric power system 1 has leeway in regard to the supply of the electric power, it becomes possible to enhance the charging rate of the charging-discharging devices, such as the stationary-type electric storage device 14, constituting the electric power system 1. Moreover, since the secondary control is performed in such a way that the electric power of each device representing an electric power element becomes constant; when the amount of electric power required in the electric power system 1 exceeds the contracted power of the commercial power system 100, a limit may be put on the maximum consumption of the electric power supplied from the commercial power system 100. As a result, the amount of electric power supplied from the commercial power system 100 to the electric power network 10 of the electric power system 1 may be prevented from exceeding the contracted power.

Moreover, in the electric power system 1, the control cycle of the secondary control is longer than the control cycle of the primary control. Hence, depending on the usage of the electric power by a plurality of electric power elements, the control of the entire electric power network 10 may be improved in a flexible manner, such as putting a limit on the maximum power consumption or utilizing the night-time electricity.

Figure 5:
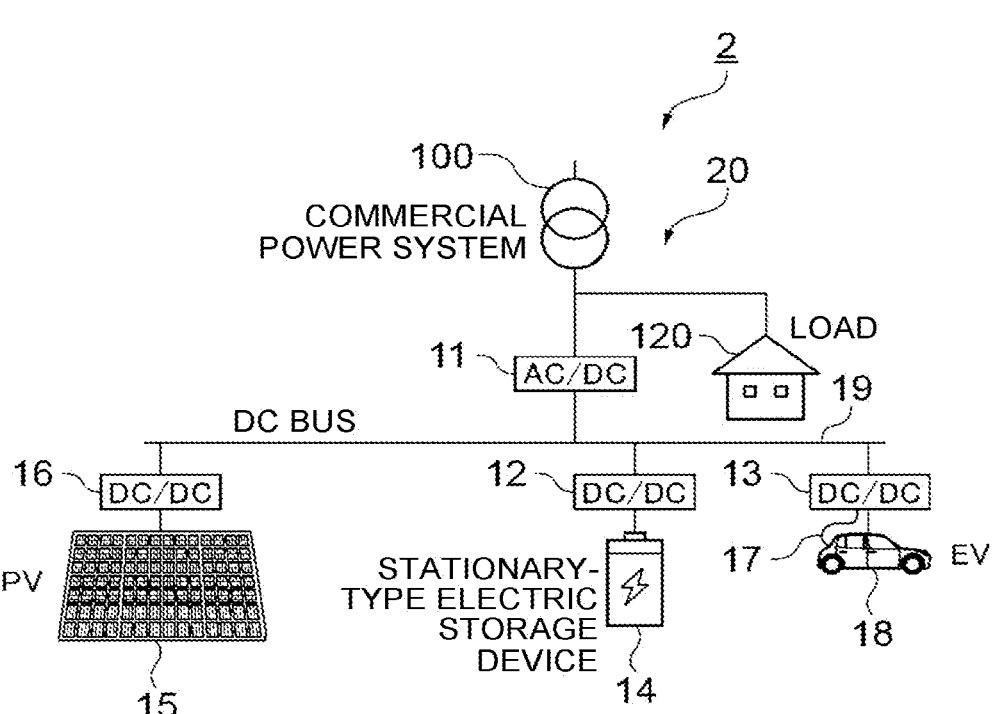
FIG. 5 is an explanatory diagram illustrating the overview of an entire electric power network constituting an electric power system according to a second embodiment of the present disclosure.
Figure 6:
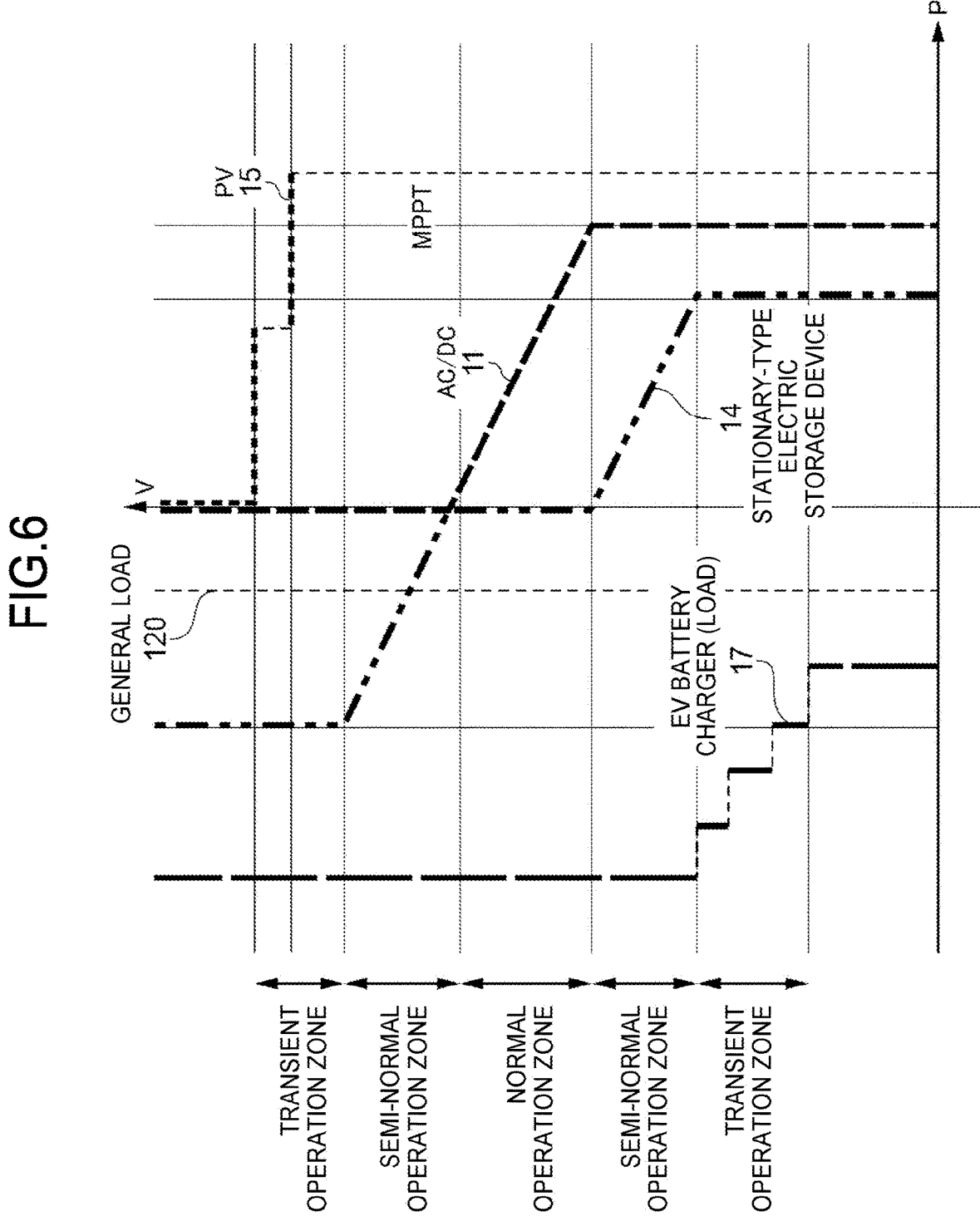
FIG. 6 is an explanatory diagram illustrating a first updating example of updating the drooping characteristic applied to the devices used in the electric power network constituting the electric power system according to the second embodiment of the present disclosure.
Figure 7:
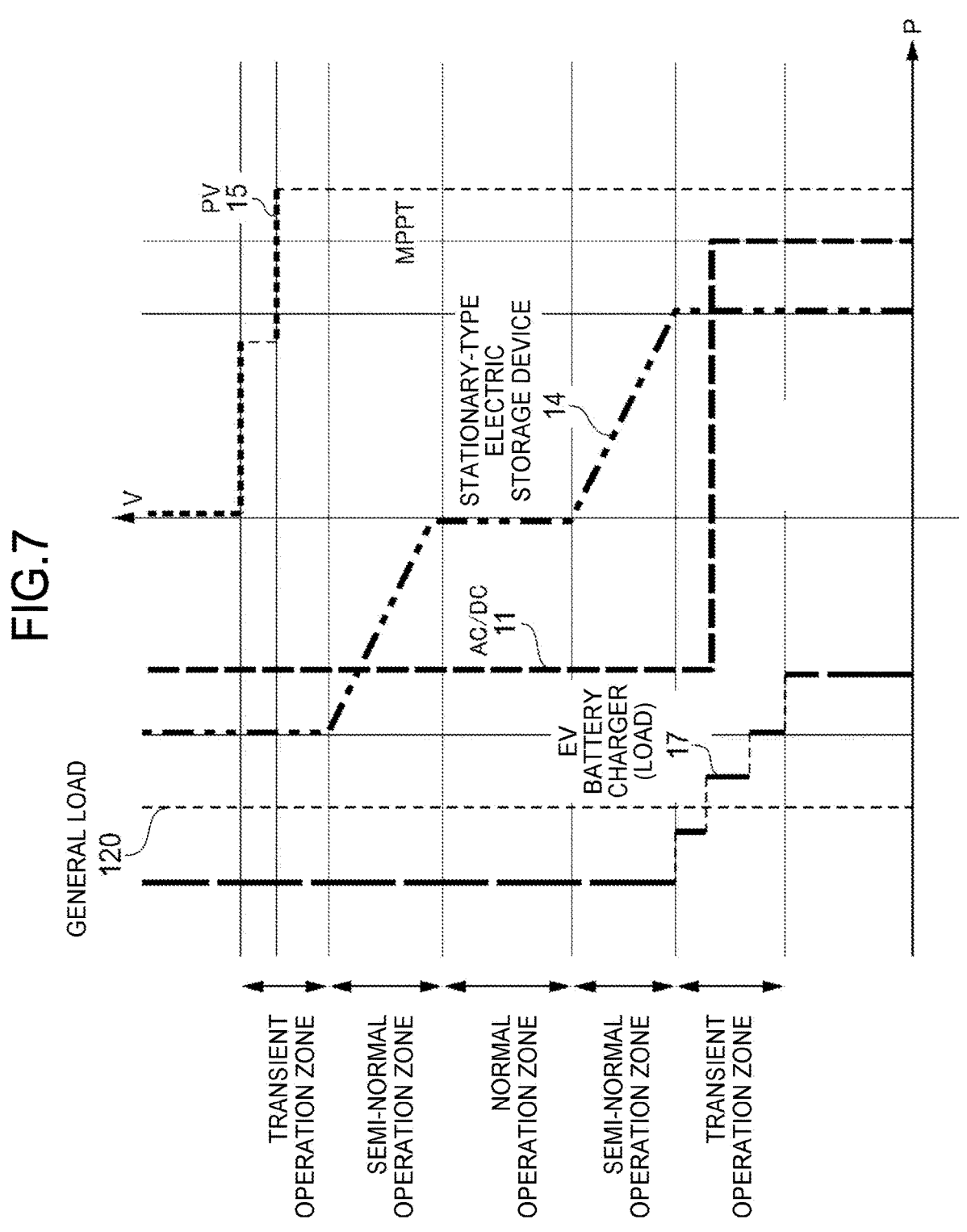
FIG. 7 is an explanatory diagram illustrating a second updating example of updating the drooping characteristic applied to the devices used in the electric power network constituting the electric power system according to the second embodiment of the present disclosure.

As an exemplary embodiment of the electric power system according to the present disclosure, given below is the explanation of an electric power system according to a second embodiment. In the electric power system according to the second embodiment, the main constituent elements are same as the electric power system according to the first embodiment. Those constituent elements are referred to by the same reference numerals. FIG. 5 is an explanatory diagram illustrating the overview of the entire electric power network constituting the electric power system according to the second embodiment of the present disclosure. FIG. 6 is an explanatory diagram illustrating a first updating example of updating the drooping characteristic applied to the devices used in the electric power network constituting the electric power system according to the second embodiment of the present disclosure. FIG. 7 is an explanatory diagram illustrating a second updating example of updating the drooping characteristic applied to the devices used in the electric power network constituting the electric power system according to the second embodiment of the present disclosure.

As illustrated in FIG. 5, in an electric power network 20 of an electric power system 2 according to the second embodiment, a house 120 is connected as a load to the commercial power system 100. When the house 120 that represents the general load has a low demand for the electric power, the balance between the demand and the supply of the electric power in the electric power system 2 according to the second embodiment is nearly identical to the balance between the demand and the supply of the electric power in the electric power system 1 according to the first embodiment. Thus, in the electric power system 2, as the function having the drooping characteristic used in performing the primary control of each of the electric power converters including the AC/DC converter 11, the bidirectional DC/DC converter 12, the first DC/DC converter 13, and the second DC/DC converter 16; it is possible to use the function having the drooping characteristic nearly identical to the electric power system 1 according to the first embodiment in which the house 120 is not connected to the commercial power system 100. Meanwhile, in FIG. 5, the central control unit 110, the external server 200, and the network NW are not illustrated.

Moreover, in the electric power system 2, when the demand for the electric power of the house 120, which represents the general load, is maintained at a low level; as illustrated in FIG. 6, in the secondary control, the function having the drooping characteristic is updated based on the function having the drooping characteristic nearly identical to that in the electric power system 1.

On the other hand, as illustrated in FIG. 7, when there is an increase in the demand for the electric power of the house 120 representing the general load, in order to prevent the power supply from exceeding the contracted power of the commercial power system 100, that is, in order put a limit on the maximum power supply from the commercial power system 100; in the secondary control, the function having the drooping characteristic is updated in such a way that the electric power is output from the AC/DC converter 11 to the commercial power system 100. In that case, the function for the primary control of the AC/DC converter 11 is updated during the secondary control in such a way that the power value output from the DC bus 19 to the commercial power system 100 becomes constant.

Meanwhile, as illustrated in FIG. 7, in order to maintain the operation voltage range of the electric power system 2, if there is a steep drop in the voltage of the DC bus 19, the AC/DC converter 11 performs voltage maintenance control of the DC bus 19 by ensuring that the electric power is supplied to the DC bus 19 from the commercial power system 100, with the aim of holding down a drop in the voltage of the DC bus 19.

Figure 8:
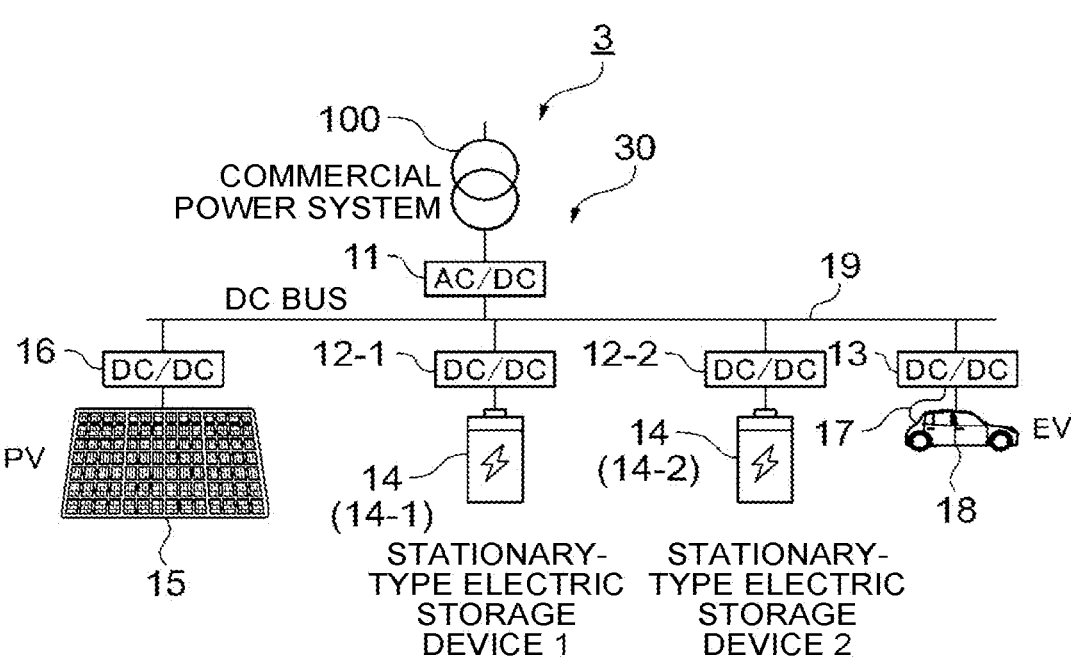
FIG. 8 is an explanatory diagram illustrating the overview of an entire electric power network constituting an electric power system according to a third embodiment of the present disclosure.
Figure 9:
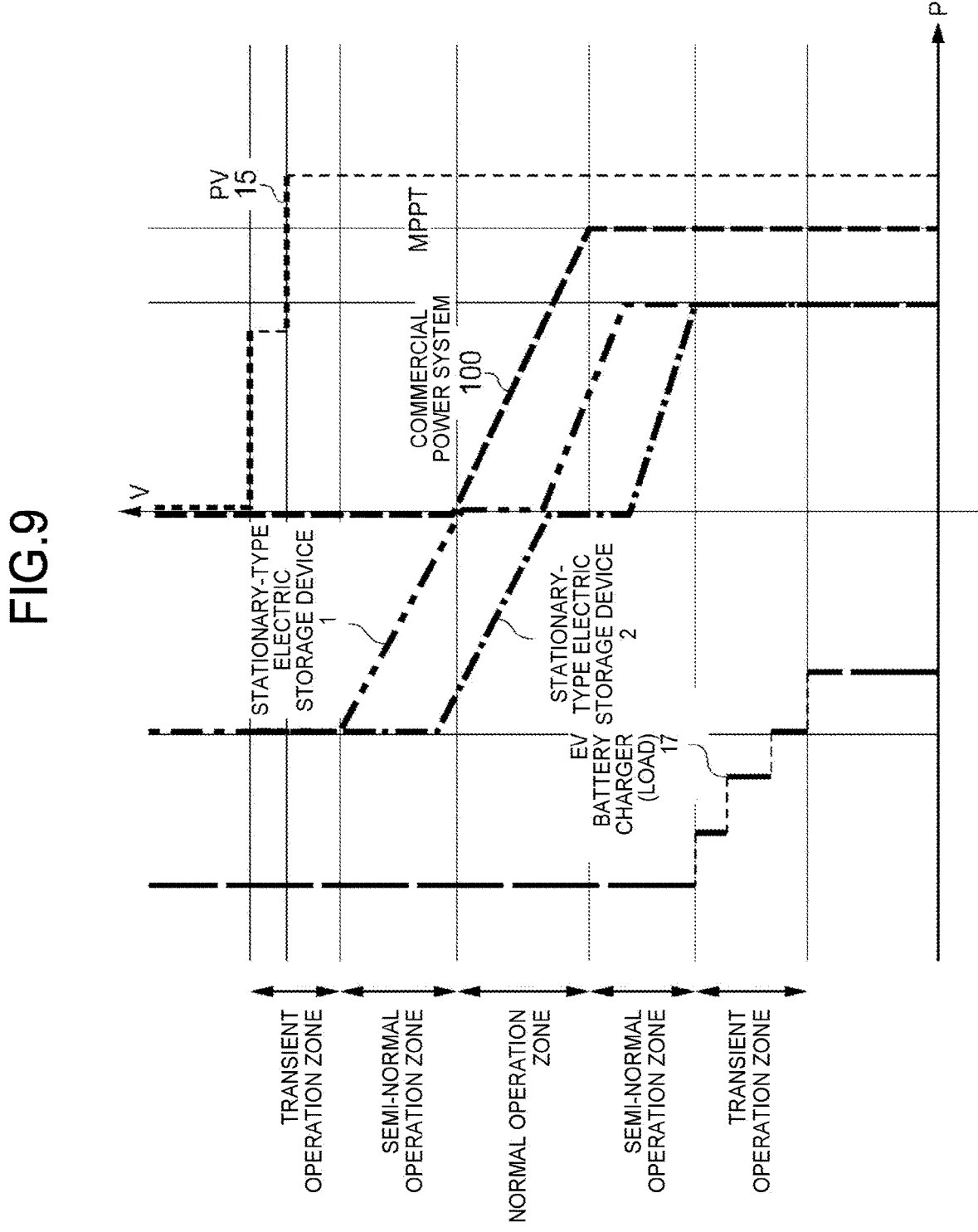
FIG. 9 is an exemplary diagram illustrating a first updating example of updating the drooping characteristic applied to the stationary-type electric storage device used in the electric power network constituting the electric power system according to the third embodiment of the present disclosure.
Figure 10:
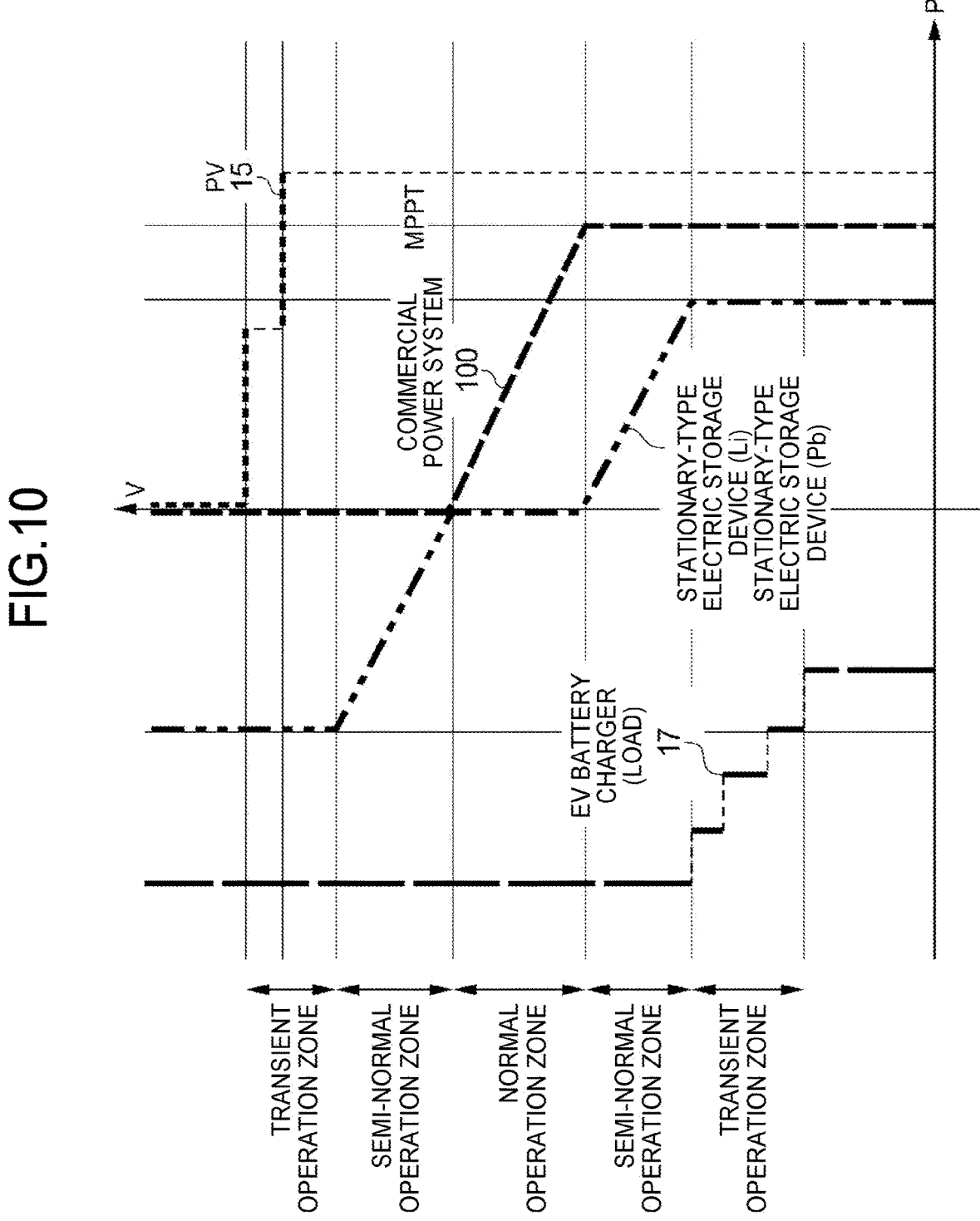
FIG. 10 is an exemplary diagram illustrating a second updating example of updating the drooping characteristic applied to the stationary-type electric storage device used in the electric power network constituting the electric power system according to the third embodiment of the present disclosure.
Figure 11:
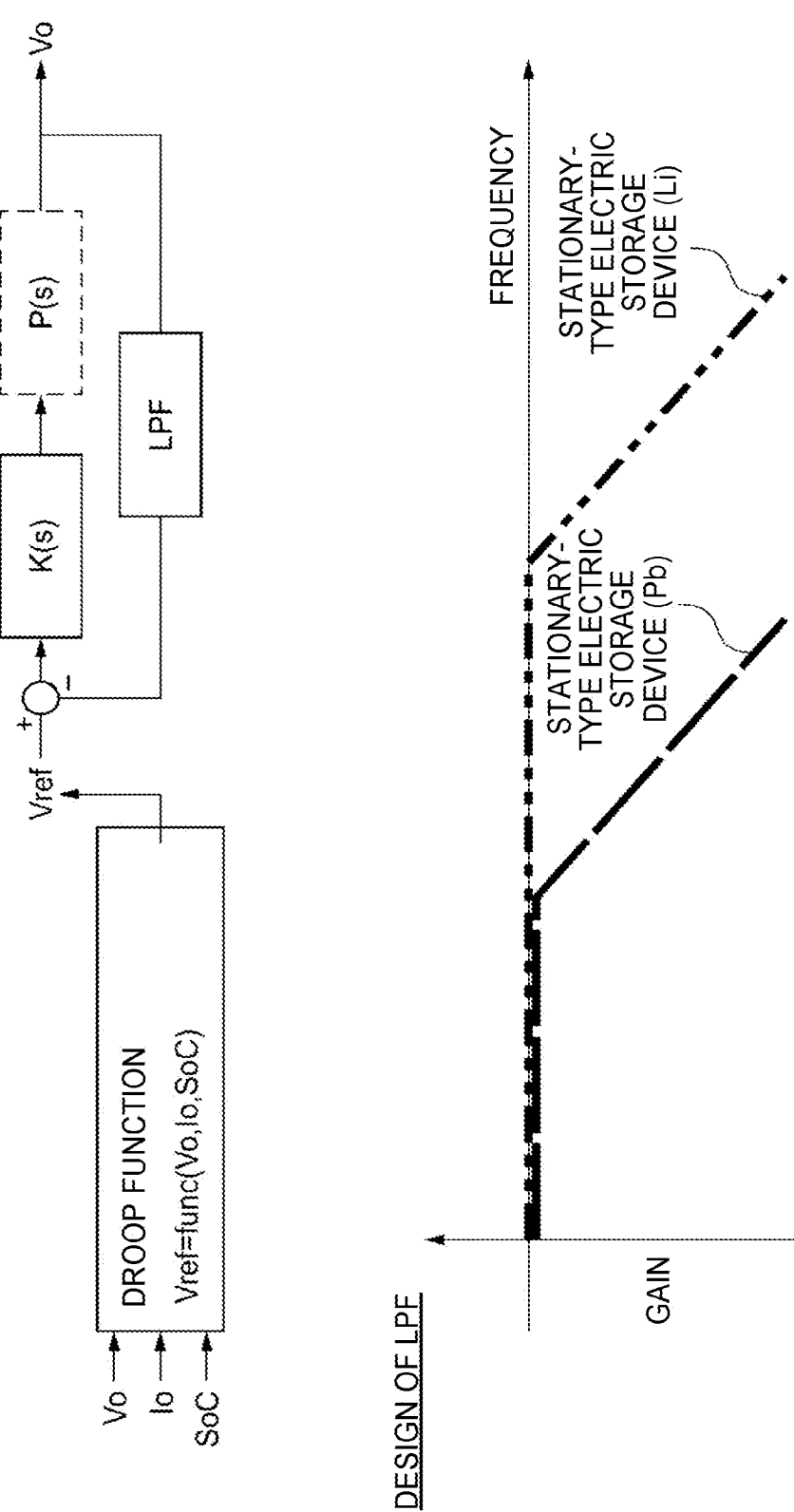
FIG. 11 is an explanatory diagram of the cutoff frequency of a lowpass filter in the second updating example of the drooping characteristic illustrated in FIG. 10.

As an exemplary embodiment of the electric power system according to the present disclosure, given below is the explanation of an electric power system according to a third embodiment. In the electric power system according to the third embodiment, the main constituent elements are same as the electric power system according to the first embodiment. Those constituent elements are referred to by the same reference numerals. FIG. 8 is an explanatory diagram illustrating the overview of the entire electric power network constituting the electric power system according to the third embodiment of the present disclosure. FIG. 9 is an exemplary diagram illustrating a first updating example of updating the drooping characteristic applied to the stationary-type electric storage device used in the electric power network constituting the electric power system according to the third embodiment of the present disclosure. FIG. 10 is an exemplary diagram illustrating a second updating example of updating the drooping characteristic applied to the stationary-type electric storage device used in the electric power network constituting the electric power system according to the third embodiment of the present disclosure. FIG. 11 is an explanatory diagram of the cutoff frequency of a lowpass filter in the second updating example of the drooping characteristic illustrated in FIG. 10.

In the electric power system 1 according to the first embodiment, the stationary-type electric storage device 14 is of the single-system-type. Alternatively, as illustrated in FIG. 8, in an electric power system 3 according to the third embodiment, dual-system-type stationary-type electric storage devices 14 are used as the stationary-type electric storage devices 14 constituting an electric power network 30. That is, the stationary-type electric storage devices 14 include a first stationary-type electric storage device 14-1 (in FIG. 9, referred to as "stationary-type electric storage device 1") and a second stationary-type electric storage device 14-2 (in FIG. 9, referred to as "stationary-type electric storage device 2").

Moreover, in the electric power system 3, corresponding to the fact that the double-system-type stationary-type electric storage devices 14 are included, the electric power network 30 includes the following: a bidirectional DC/DC converter 12-1 that is connected to the DC bus 19 and that converts the direct-current power input from the DC bus 19 into the charging voltage for the first stationary-type electric storage device 14-1; and a bidirectional DC/DC converter 12-2 that is connected to the DC bus 19 and that converts the direct-current power input from the DC bus 19 into the charging voltage for the second stationary-type electric storage device 14-2. Meanwhile, in FIG. 8, the central control unit 110, the external server 200, and the network NW are not illustrated.

In the electric power system 3, because of the difference between the charging-discharging property of the first stationary-type electric storage device 14-1 and the charging-discharging property of the second stationary-type electric storage device 14-2, there are times when the charging rate (SoC) of the first stationary-type electric storage device 14-1 significantly differs from the charging rate (SoC) of the second stationary-type electric storage device 14-2. In that case, as illustrated in FIG. 19, at the time of updating the reference function, which has the drooping characteristic, according to the secondary control; the intercept of the reference function of the stationary-type electric storage device 14 having the higher charging rate (with reference to FIG. 9, the stationary-type electric storage device 1) is shifted more upward as compared to the reference function of the electric power system 1 illustrated in FIG. 2. In the stationary-type electric storage device 14 having the higher charging rate, as a result of performing an update to shift the intercept of the reference function upward, it becomes easier to perform discharging in the normal operation zone and in the semi-normal operation zone in which the demand for the electric power is high.

On the other hand, as illustrated in FIG. 9, at the time of updating the reference function, which has the drooping characteristic, according to the secondary control; the intercept of the reference function of the stationary-type electric storage device 14 having the lower charging rate (with reference to FIG. 9, the stationary-type electric storage device 2) is shifted more downward as compared to the reference function of the electric power system 1 illustrated in FIG. 2. In the stationary-type electric storage device 14 having the lower charging rate, as a result of performing an update to shift the intercept of the reference function downward, it becomes easier to perform charging also in the semi-normal operation zone in which the demand for electric power is low.

As explained above, even if the situation is such that the charging rate of the first stationary-type electric storage device 14-1 is significantly different than the charging rate of the second stationary-type electric storage device 14-2, the reference function having the drooping characteristic regarding the first stationary-type electric storage device 14-1 and the second stationary-type electric storage device 14-2 is updated according to the secondary control. As a result, the charging rate of the first stationary-type electric storage device 14-1 and the charging rate of the second stationary-type electric storage device 14-2 increasingly become leveled. Hence, even if the stationary-type electric storage devices 14 of a multi-system-type are included, it still becomes possible to enhance the charging-discharging efficiency of all stationary-type electric storage devices 14.

Moreover, if the first stationary-type electric storage device 14-1 has different battery properties than the battery properties of the second stationary-type electric storage device 14-2 (for example, if different types of storage batteries are installed in the stationary-type electric storage devices 14), it is possible to have a configuration in which, for example, the frequencies of the electric power output from the stationary-type electric storage devices 14 are shared.

For example, as illustrated in FIG. 10, assume that a lithium-ion secondary battery having a high C rating, which indicates the responsiveness to charging and discharging, and having a high cost is installed in the first stationary-type electric storage device 14-1 (in FIG. 10, referred to as stationary-type electric storage device (Li)), and assume that a lead storage battery having a low C rating and having a low cost is installed in the second stationary-type electric storage device 14-2 (in FIG. 10, referred to as stationary-type electric storage device (Pb)). In that case, during the secondary control of the electric power system 3, the function having the drooping characteristic is updated based on the function having the drooping characteristic same as the electric power system 1. Hence, the first stationary-type electric storage device 14-1 and the second stationary-type electric storage device 14-2 are equipped with the function having the nearly identical drooping characteristic.

On the other hand, as illustrated in FIG. 11, with the aim of performing the secondary control to update the function having the drooping characteristic, for example, in the first stationary-type electric storage device 14-1 having a high C rating (in FIG. 11, the stationary-type electric storage device (Li)), when the bidirectional DC/DC converter 12-1 that is connected to the first stationary-type electric storage device 14-1 provides feedback of the measurement values of the voltage and the electric current during the primary control, the lowpass filter (LPF) is set to have a high cutoff frequency. In contrast, in the second stationary-type electric storage device 14-2 having a low C rating (in FIG. 11, the stationary-type electric storage device (Pb)), when the bidirectional DC/DC converter 12-2 that is connected to the second stationary-type electric storage device 14-2 provides feedback of the measurement values of the voltage and the electric current during the primary control, the lowpass filter (LPF) is set to have a low cutoff frequency.

In this way, according to the properties of the storage batteries of the stationary-type electric storage devices 14, the setting value of the cutoff frequency may be varied, and the frequencies of the electric power output from the stationary-type electric storage device 14 may be shared.

Figure 12:
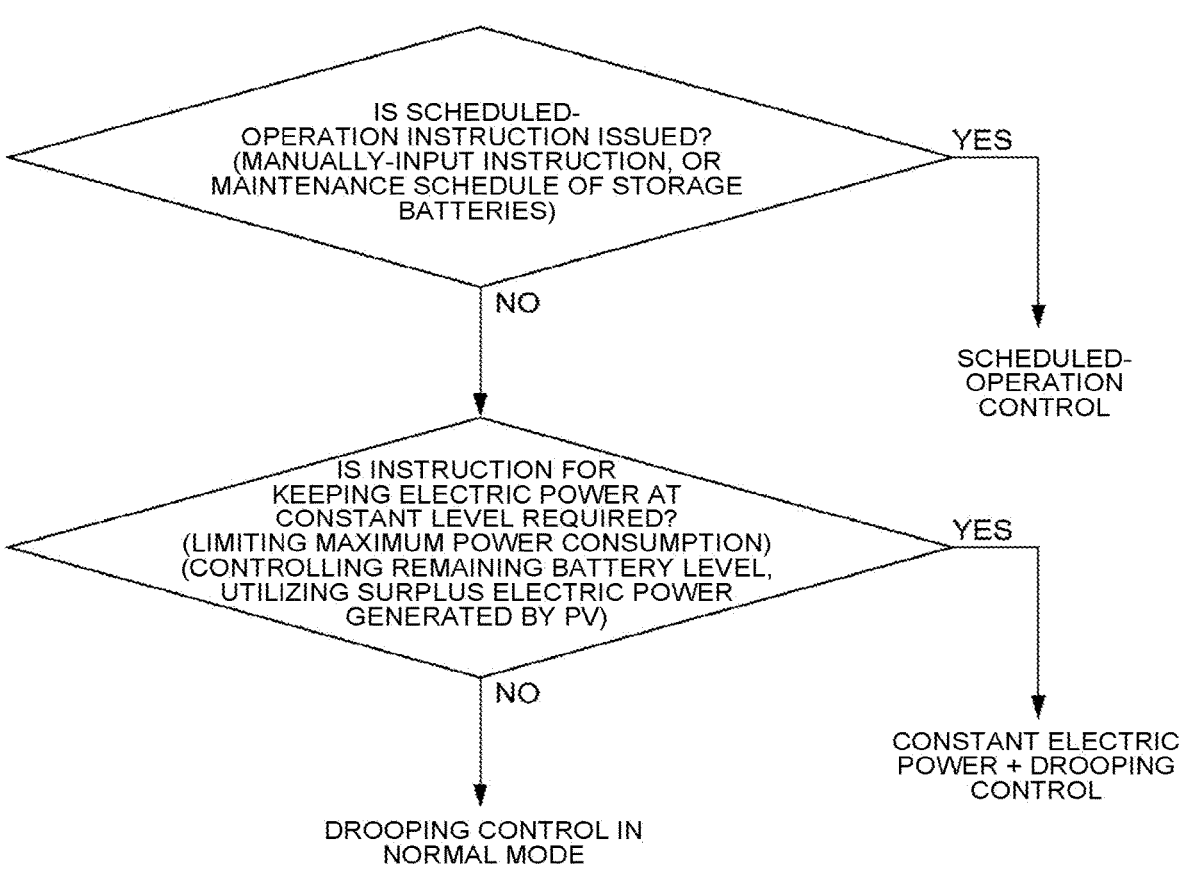
FIG. 12 is a flowchart for control mode determination performed in the electric power system of the present disclosure.

Given below is the explanation of a determination chart of a secondary control mode. FIG. 12 is a flowchart for control mode determination performed in the electric power system of the present disclosure.

As illustrated in FIG. 12, according to the maintenance schedule of the storage batteries of the stationary-type electric storage device 14 that is either manually input or set in advance, a determining unit of the central control unit 110 determines whether or not a scheduled-operation instruction is issued by some other control unit (not illustrated). If the determining unit of the central control unit 110 determines that a scheduled-operation instruction is issued, then the central control unit 110 performs scheduled-operation control as the secondary control.

On the other hand, if it is determined the scheduled-operation instruction is not issued, then the determining unit of the central control unit 110 determines whether or not an instruction for keeping the electric power of the devices representing the electric power elements at a constant level is issued by the other control unit (not illustrated). Examples of the instruction for keeping the electric power of the devices representing the electric power elements at a constant level include performing maximum-consumption-limiting control of the commercial power system 100 as performed by the AC/DC converter 11, and increasing the charging rate of the storage batteries of the stationary-type electric storage device 14 using the surplus electric power of the photovoltaic device (PV) 15. If an instruction for keeping the electric power of the devices of the electric power elements at a constant level is issued by the other control unit (not illustrated), then the central control unit 110 performs the secondary control in the form of updating the reference function of the target electric power elements in such a way that the electric power of the devices representing the electric power elements becomes constant. However, if an instruction for keeping the electric power of the devices of the electric power elements at a constant level is not issued by the other control unit (not illustrated), then the central control unit 110 updates the reference function in the normal mode.

Figure 13:
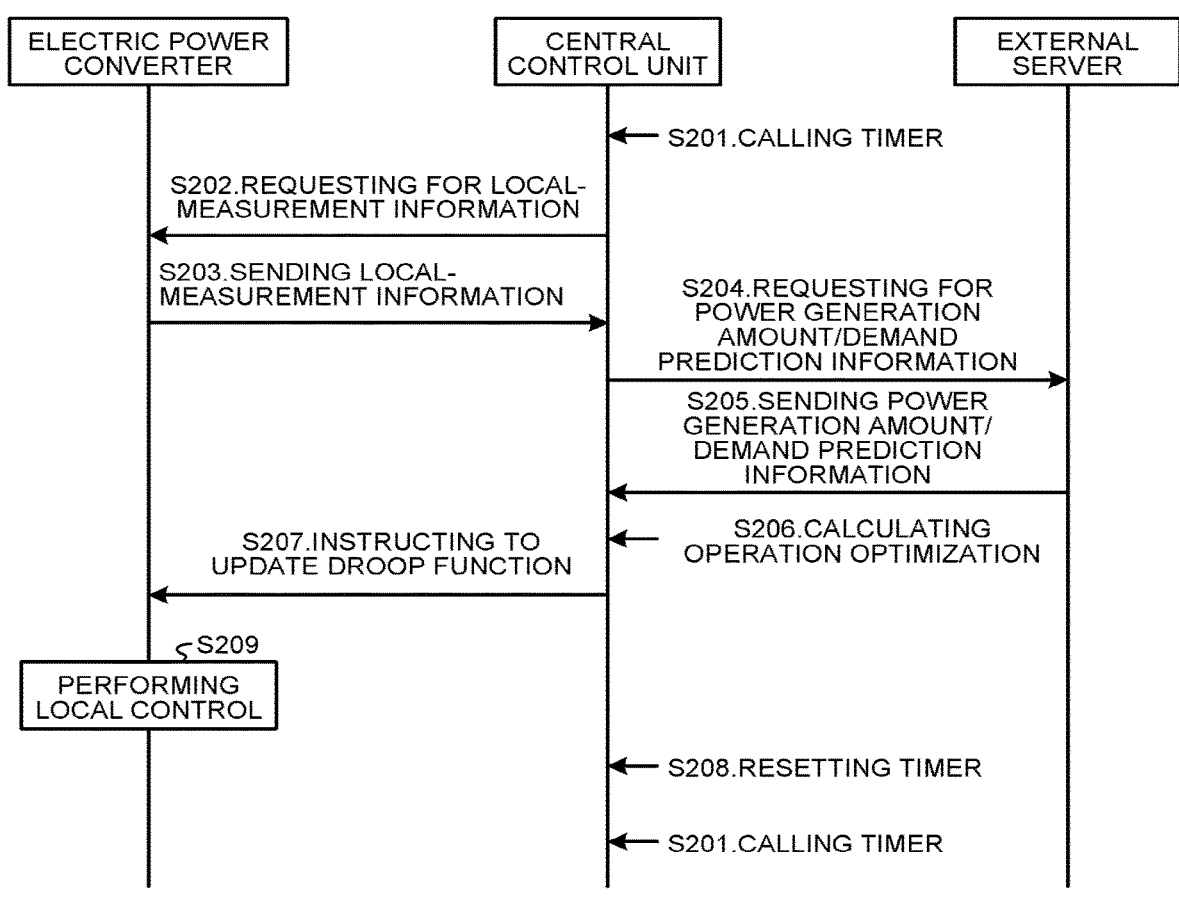
FIG. 13 is a sequence diagram illustrating an exemplary control method for an electric power system.

Explained below with reference to a sequence diagram illustrated in FIG. 13 is an exemplary control method implemented for performing centralized control of an electric power system. Herein, although the control method is explained with reference to the electric power system 1, it may also be implemented for other electric power systems.

Firstly, at Step S201, the central control unit 110 calls the timer provided therein and starts timekeeping. Then, at Step S202, the central control unit 110 requests each electric power converter for local-measurement information. The local-measurement information represents an example of the information related to the electric power status of the electric power system 1, and contains the measured values measured by the sensor of each electric power converter and contains the measured timings.

Then, at Step S203, each electric power converter sends the local-measurement information to the central control unit 110. The central control unit 110 stores each set of local-measurement information in the memory unit.

Subsequently, at Step S204, the central control unit 110 requests the external server 200 for a variety of information that is likely to affect the operation of the electric power system 1 as an example of the information related to the electric power status of the electric power system 1. In the present example, the central control unit 110 requests the external server 200 for power generation amount/demand prediction information. The power generation amount/demand prediction information contains the prediction information about the power generation amount in the electric power system 1 and contains the prediction information about the demand for electric power; and may also contain, for example, the information about the season of the region in which the electric power system 1 is installed, the present weather, and the weather forecast. Moreover, if the external server 200 functions as the EMS of another electric power system, when the state of operation of that other electric power system is likely to affect the operation of the electric power system 1, the power generation amount/demand prediction information may also contain the prediction information about the power generation amount and the prediction information about the demand for electric power in the other electric power system.

Then, at Step S205, the external server 200 sends the power generation amount/demand prediction information to the central control unit 110. The central control unit 110 stores the power generation amount/demand prediction information in the memory unit.

Subsequently, at Step S206, the control unit of the central control unit 110 reads the received information, that is, reads the information related to the electric power status of the electric power system 1 from the memory unit; and accordingly performs operation optimization calculation for the electric power system 1.

The operation optimization calculation is performed to be applicable to various conditions. For example, the electric power system 1 is assumed to be controlled in such a way that the DC bus 19 has the operating point at a predetermined voltage. In that state, assume that, according to the power generation amount/demand prediction information, the weather forecast in the region in which the photovoltaic device 15 is installed indicates clear skies and the power generation amount of the photovoltaic device 15 is predicted to increase, and assume that, from the local-measurement information obtained from the second DC/DC converter 16 connected to the photovoltaic device 15, the central control unit 110 determines that the photovoltaic device 15 has leeway in regard to the supply of the electric power. In that case, the central control unit 110 determines to update the reference function of the bidirectional DC/DC converter 12, which is connected to the stationary-type electric storage device 14, in such a way that the stationary-type electric storage device 14 is charged at the abovementioned operating point. Moreover, at the same time of that updating, the central control unit 110 determines to update the reference function of the AC/DC converter 11 in such a way that no electric power is supplied from the commercial power system 100. Meanwhile, the reference function need not be updated, but may be switched instead.

Moreover, the operation optimization calculation may also be performed by setting conditions, such as putting the limit on the maximum power consumption or utilizing the night-time electricity, from the perspective of ensuring that the contracted power of the commercial power system 100 is not exceeded or from the perspective of having appropriate electricity costs.

The memory unit of the central control unit 110 may be used to store an already-learnt model, and the central control unit 110 may perform the operation optimization calculation using the already-learnt model. As the already-learnt model, for example, it is possible to use an already-learnt model that is generated by performing deep learning using a neural network and using teacher data represented by the information related to the electric power status of the electric power system 1 and the corresponding result of switching or updating of the reference function with respect to each electric power converter.

Subsequently, at Step S207, the central control unit 110 outputs an updating command, which is meant for updating the reference function, to the electric power converters to be updated from among all electric power converters; and implements the updating step. Then, at Step S208, the central control unit 110 resets the timer. Subsequently, at Step S209, each electric power converter performs the local-control. The local-control has the electric power status of the electric power system 1 reflected therein, and all electric power converters are subjected to coordinated control.

Given below is the explanation of other embodiments of the electric power system according to the present disclosure. In the electric power system according to the embodiments described above, the reference function having the drooping characteristic is configured to vary the amount of output of the electric power according to the variation in the voltage. Alternatively, the reference function having the drooping characteristic may be configured to vary the amount of output of the electric current according to the variation in the voltage.

Moreover, as the method for making the relationship between the voltage and the electric power of the concerned device follow the reference function, for example, an electric power converter may measure its voltage and set the target electric power from the reference function, and may make the electric power follow the target electric power. Alternatively, an electric power converter may measure its electric power and set the target voltage from the reference function, and may make the voltage follow the target voltage.

Meanwhile, in the electric power system according to the embodiments, the central control unit is separately installed that performs the secondary control in a centralized manner. Alternatively, the configuration may be such that at least one of a plurality of electric power converters may be equipped to function as the central control unit that controls a plurality of electric power converters.

Figure 14:
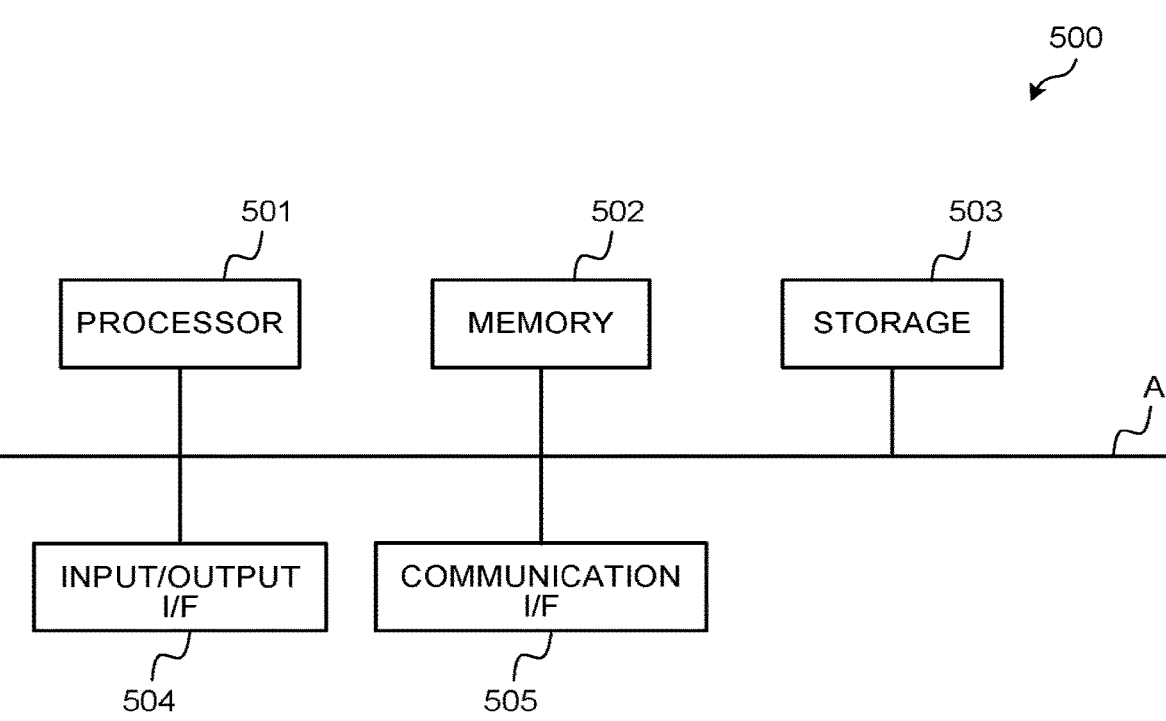
FIG. 14 is a diagram illustrating a configuration of a computer realizing a control unit of an electric power converter.

The control unit of the electric power system according to the disclosure may be realized by a computer. FIG. 14 is a block diagram illustrating a computer 500 realizing the control unit of the electric power system. The computer 500 includes: a processor 501; a memory 502; a storage 503; an input/output interface (I/F) 504; and a communication interface (I/F) 505. The processor 501, the memory 502, the storage 503, the input/output I/F 504 and the communication I/F 505 are connected to a bus A.

The memory 502 may be, for example, the above-described RAM and may be configured by a volatile or non-volatile memory. The memory 502 provides a working space for arithmetic processing of the processor 501 and stores a result of the arithmetic processing. The storage 503 may be configured by the above-described ROM and the above-described auxiliary memory device such as the HDD, the SSD or the likes. The storage 503 stores a computer program and data for the processor 501 to execute the arithmetic processing. The input/output I/F 504 is connected to the electric power converter and outputs the PWM signal for performing the PWM control of the electric power converter. The communication I/F 505 corresponds to the above-described communication unit and communicates with the central control unit 110 via wired or wireless communication. The processor 501 may be, for example, the above-described CPU. The processor 501 reads the computer program from the storage 503 and executes the computer program by using the memory 502 as a working space. The processor 501 may be an ASIC (Application Specific Integrated Circuit), an FPGA (Field-Programmable Gate Array), a DSP (Digital Signal Processor), or a GPU (Graphics Processing Unit). The function of the electric power converter is realized by the execution of the computer program by the processor 501.

According to an aspect of an electric power converter and an electric power system that includes the electric power converter according to the present disclosure, a function for primary control is provided that is based on a reference function which has a drooping characteristic for generating the target value when local-control of a device connected to the electric power converter is implemented according to the voltage measured by the electric power converter. Moreover, a function for secondary control is provided for updating the reference function, which has the drooping characteristic, according to the electric power status of a plurality of electric power elements. The control cycle of the primary control and the control cycle of the secondary control implement different types of hierarchical control. As a result, the time-varying required electric power of the entire electric power network is accurately reflected in the control of each device. It results in an improved control of the entire electric power network, and the required electric power may be efficiently supplied to the entire electric power network. Moreover, according to an aspect of the electric power converter and the electric power system that includes the electric power converter according to the present disclosure, the function for the secondary control is further provided for updating the reference function, which has the drooping characteristic, according to the electric power status of the plurality of electric power elements. As a result, according to the electric power status of the electric power elements, the control of the entire electric power network may be performed in a flexible manner, such as putting a limit on the maximum power consumption or utilizing the night-time electricity.

Furthermore, according to an aspect of the electric power converter and the electric power system that includes the electric power converter according to the present disclosure, the electric power system further includes a central control unit that controls a plurality of electric power converters. The secondary control is performed based on a command issued by the central control unit. As a result, the time-varying required electric power of the entire electric power network may be reflected with more accuracy in the control of each device, and the control of the entire electric power network may be improved in a more reliable manner.

Moreover, according to an aspect of the electric power converter and the electric power system that includes the electric power converter according to the present disclosure, the secondary control is performed in such a way that the electric power of each device representing an electric power element becomes constant. As a result, when the electric power system has leeway in regard to the supply of the electric power, it becomes possible to enhance the charging rate of the charging-discharging devices, such as a stationary-type electric storage device, constituting the electric power system. Moreover, since the secondary control is performed in such a way that the electric power of each device representing an electric power element becomes constant; when the amount of electric power required in the electric power system exceeds the contracted power of the commercial power system, a limit may be put on the maximum consumption of the electric power supplied from the commercial power system. As a result, the amount of electric power supplied from the commercial power system to the electric power system may be prevented from exceeding the contracted power.

Furthermore, according to an aspect of the electric power converter and the electric power system that includes the electric power converter according to the present disclosure, the secondary control is controlled based on relationship between the amount of electric power discharge from a line to which a plurality of electric power elements is connected and the amount of electric power received by the line. As a result, the time-varying required electric power of the entire electric power network may be reflected with more accuracy in the control of each device, and the control of the entire electric power network may be improved in a more reliable manner.

Moreover, according to an aspect of the electric power converter and the electric power system that includes the electric power converter according to the present disclosure, the control cycle of the secondary control is longer than the control cycle of the primary control. Hence, depending on the usage of the electric power by a plurality of electric power elements, the control of the entire electric power network may be improved in a flexible manner, such as putting a limit on the maximum power consumption or utilizing the night-time electricity.

Furthermore, according to an aspect of a control method for an electric power converter, a control method for an electric power system, and a program according to the present disclosure, the control of the entire electric power network may be improved by accurately reflecting, in the control of each device, the time-varying required electric power of the entire electric power network; and the required electric power for the entire electric power network may be supplied in an efficient manner.

The electric power system according to the present disclosure enables achieving improvement in the control of the entire electric power network by accurately reflecting, in the control of each device, the time-varying required electric power of the entire electric power network; and enables supplying the required electric power for the entire electric power network in an efficient manner. Hence, the electric power system has a high utility value in the field of DC grids having electric power networks in which the locally produced electric power is locally consumed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric power converter configured to be electrically connected to a commercial power system of alternating current type and electrically connected to a device configured to input and/or output electric power, the electric power converter comprising:

a control unit configured to perform primary control of the device based on a reference function which has a drooping characteristic for generating a target value when local-control of the device is implemented according to a voltage measured by the electric power converter, wherein the electric power converter is further controlled according to secondary control in which the reference function having the drooping characteristic is updated according to an electric power status of an electric power system in which the electric power converter is installed, wherein a control cycle of the primary control is different from a control cycle of the secondary control, wherein the secondary control is either performed by a central control unit included in the electric power system and configured to execute the secondary control, or performed by at least one of a plurality of electric power converters included in the electric power system and configured to execute the secondary control for all of the plurality of electric power converters, the electric power converter being one of the plurality of electric power converters included in the electric power system, wherein the primary control is performed based on a voltage of the device, wherein the secondary control is controlled based on a relationship between a discharge amount of electric power discharged from a line connected to the electric power converter and a received amount of electric power received by the line, and wherein the central control unit or the power converter executing the secondary control is configured to calculate the discharge amount and the received amount from local measurement information of each of the power converters, and transmit the updated reference function when it is determined that the reference function needs to be updated, and each of the power converters is configured to execute the primary control using the updated reference function.

2. The electric power converter according to claim 1, wherein the electric power system comprises the central control unit configured to control the plurality of the electric power converters, and the secondary control is performed based on a command issued by the central control unit.

3. The electric power converter according to claim 1, wherein the primary control is performed based on the voltage of the device, without involving a command from a central control unit configured to control a plurality of the electric power converters.

4. The electric power converter according to claim 1, wherein the reference function having the drooping characteristic is configured to vary an input-output amount of electric power or electric current according to variation in voltage.

5. The electric power converter according to claim 1, wherein the secondary control includes updating the reference function having the drooping characteristic in such a way that electric power of the device becomes constant.

6. The electric power converter according to claim 1, wherein the control cycle of the secondary control is longer than the control cycle of the primary control.

7. The electric power converter according to claim 1, wherein the electric power converter is a DC/DC converter.

8. The electric power converter according to claim 1, wherein, at least one of the plurality of electric power converters is configured to function as a central control unit configured to execute the secondary control of the plurality of electric power converters.

9. An electric power system comprising:

a plurality of electric power elements electrically connected to a commercial power system of alternating current type, each electric power element including an electric power converter and a device electrically connected to the electric power converter, wherein:

the electric power converter includes a control unit configured to perform primary control based on a reference function having a drooping characteristic for generating a target value when local-control of the device is implemented according to a voltage measured by the electric power converter, the electric power system is equipped with function of secondary control in which the reference function having the drooping characteristic is updated according to an electric power status of the plurality of electric power elements, a control cycle of the primary control is different from a control cycle of the secondary control, the secondary control is either performed by a central control unit included in the electric power system and configured to execute the secondary control, or performed by at least one of a plurality of electric power converters included in the electric power system and configured to execute the secondary control for all of the plurality of electric power converters, the electric power converter being one of the plurality of electric power converters included in the electric power system, the primary control is performed based on a voltage of the device, the secondary control is controlled based on a relationship between a discharge amount of electric power discharged from a line connected to the electric power converter and a received amount of electric power received by the line, and the central control unit or the power converter executing the secondary control is configured to calculate the discharge amount and the received amount from local measurement information of each of the power converters, and transmit the updated reference function when it is determined that the reference function needs to be updated, and each of the power converters is configured to execute the primary control using the updated reference function.

10. The electric power system according to claim 9, further comprising the central control unit configured to control the plurality of the electric power converter, wherein the secondary control is performed based on a command issued by the central control unit.

11. The electric power system according to claim 9, wherein the primary control is performed based on the voltage of the device, without involving a command from a central control unit configured to control a plurality of the electric power converter.

12. The electric power system according to claim 9, wherein the reference function having the drooping characteristic is configured to vary an input-output amount of electric power or electric current according to variation in voltage.

13. The electric power system according to claim 9, wherein the secondary control includes updating the reference function having the drooping characteristic in such a way that electric power of devices of the electric power elements becomes constant.

14. The electric power system according to claim 9, wherein the control cycle of the secondary control is longer than the control cycle of the primary control.

15. The electric power system according to claim 9, wherein a line on which the electric power elements are electrically connected is a DC bus.

16. The electric power system according to claim 10, wherein, at least one of the plurality of electric power converters is configured to function as a central control unit configured to execute the secondary control of the plurality of electric power converters.

17. A control method for an electric power converter electrically connected to a commercial power system of alternating current type and electrically connected to a device configured to input and/or output electric power, the control method comprising:

performing primary control of the device based on a reference function having a drooping characteristic for generating target value when local-control of the device is implemented according to a voltage measured by the electric power converter; and controlling the electric power converter according to secondary control in which the reference function having the drooping characteristic is updated according to an electric power status of an electric power system in which the electric power converter is installed, wherein:

a control cycle of the primary control is different from a control cycle of the secondary control, the secondary control is either performed by a central control unit included in the electric power system and configured to execute the secondary control, or performed by at least one of a plurality of electric power converters included in the electric power system and configured to execute the secondary control for all of the plurality of electric power converters, the electric power converter being one of the plurality of electric power converters included in the electric power system, the primary control is performed based on a voltage of the device, the secondary control is controlled based on a relationship between a discharge amount of electric power discharged from a line connected to the electric power converter and a received amount of electric power received by the line, and the central control unit or the power converter executing the secondary control is configured to calculate the discharge amount and the received amount from local measurement information of each of the power converters, and transmit the updated reference function when it is determined that the reference function needs to be updated, and each of the power converters is configured to execute the primary control using the updated reference function.

18. A control method for an electric power system including a plurality of electric power elements, each including: an electric power converter electrically connected to a commercial power system of alternating current type; and a device electrically connected to the electric power converter, the control method comprising:

performing primary control based on a reference function which has drooping characteristic for generating target value when local-control of the device is implemented according to a voltage measured by the electric power converter; and performing secondary control in which the reference function having the drooping characteristic is updated according to an electric power status of the plurality of electric power elements, wherein:

a control cycle of the primary control is different from a control cycle of the secondary control, the secondary control is either performed by a central control unit included in the electric power system and configured to execute the secondary control, or performed by at least one of a plurality of electric power converters included in the electric power system and configured to execute the secondary control for all of the plurality of electric power converters, the electric power converter being one of the plurality of electric power converters included in the electric power system, the primary control is performed based on a voltage of the device, the secondary control is controlled based on a relationship between a discharge amount of electric power discharged from a line connected to the electric power converter and a received amount of electric power received by the line, and the central control unit or the power converter executing the secondary control is configured to calculate the discharge amount and the received amount from local measurement information of each of the power converters, and transmit the updated reference function when it is determined that the reference function needs to be updated, and each of the power converters is configured to execute the primary control using the updated reference function.

19. A control method for an electric power system including: a plurality of electric power elements, each including an electric power converter electrically connected to a commercial power system of alternating current type and including a device electrically connected to the electric power converter; and a central control device configured to communicate information with the plurality of electric power converters and with an external server which holds demand information about demand of electric power, the control method comprising:

performing primary control based on a reference function having drooping characteristic for generating target value when local-control of the device is implemented according to a voltage measured by the electric power converter;

obtaining the demand information from the external server; and performing secondary control in which the reference function having the drooping characteristic is updated according to an electric power status of the plurality of electric power elements and according to the demand information, wherein:

a control cycle of the primary control is different than a control cycle of the secondary control, the secondary control is either performed by a central control unit included in the electric power system and configured to execute the secondary control, or performed by at least one of a plurality of electric power converters included in the electric power system and configured to execute the secondary control for all of the plurality of electric power converters, the electric power converter being one of the plurality of electric power converters included in the electric power system, the primary control is performed based on a voltage of the device, the secondary control is controlled based on a relationship between a discharge amount of electric power discharged from a line connected to the electric power converter and a received amount of electric power received by the line, and the central control unit or the power converter executing the secondary control is configured to calculate the discharge amount and the received amount from local measurement information of each of the power converters, and transmit the updated reference function when it is determined that the reference function needs to be updated, and each of the power converters is configured to execute the primary control using the updated reference function.

* * * * *